United States Patent
Schwarz et al.

(12)
(10) Patent No.: US 11,023,194 B2
(45) Date of Patent: Jun. 1, 2021

(54) MODULAR MODULE

(71) Applicant: OSRAM Opto Semiconductors GmbH, Regensburg (DE)

(72) Inventors: Thomas Schwarz, Regensburg (DE); Frank Singer, Regenstauf (DE); Jürgen Moosburger, Lappersdorf (DE); Karl Engl, Niedergebraching (DE); Alexander Martin, Sinzing (DE)

(73) Assignee: OSRAM OLED GmbH, Regensburg (DE)

( * ) Notice: Subject to any disclaimer, the term of this patent is extended or adjusted under 35 U.S.C. 154(b) by 57 days.

(21) Appl. No.: 16/314,467

(22) PCT Filed: Jun. 30, 2017

(86) PCT No.: PCT/EP2017/066312
§ 371 (c)(1),
(2) Date: Dec. 31, 2018

(87) PCT Pub. No.: WO2018/002321
PCT Pub. Date: Jan. 4, 2018

(65) Prior Publication Data
US 2019/0155564 A1 May 23, 2019

(30) Foreign Application Priority Data
Jul. 1, 2016 (DE) ...................... 10 2016 112 104.5

(51) Int. Cl.
*G09G 1/00* (2006.01)
*G06F 3/14* (2006.01)
*G09G 3/32* (2016.01)

(52) U.S. Cl.
CPC ............. *G06F 3/1446* (2013.01); *G09G 3/32* (2013.01); *G09G 2300/026* (2013.01); *G09G 2300/0426* (2013.01)

(58) Field of Classification Search
CPC ............ G09F 9/302; G06F 3/14; G06F 3/147; G09G 3/3208
See application file for complete search history.

(56) References Cited

U.S. PATENT DOCUMENTS

2001/0024178 A1    9/2001 Takeuchi et al.
2007/0001927 A1*   1/2007 Ricks .................... G09F 9/3026
                                                   345/1.1
(Continued)

FOREIGN PATENT DOCUMENTS

EP         0 908 919 A1    4/1999
WO         03/092073 A2    11/2003
WO         2015/151648 A1  10/2015

*Primary Examiner* — Michael A Faragalla
(74) *Attorney, Agent, or Firm* — DLA Piper LLP (US)

(57) ABSTRACT

An arrangement includes at least two modules for a video wall including light-emitting components arranged on a carrier, wherein a drive circuit that selectively drives the component at the carrier is provided for each component, row lines and column lines are provided, each drive circuit connects to a row line and a column line, each drive circuit connects to power supply lines, the carrier includes plated-through holes that guide the row lines and the column lines onto an underside of the carrier, the two modules are arranged on a further carrier, the further carrier includes at least one recess, an electrical connector is arranged in the recess, and the electrical connector connects column lines and/or row lines of the two modules to one another.

20 Claims, 18 Drawing Sheets

(56) References Cited

U.S. PATENT DOCUMENTS

| | | | |
|---|---|---|---|
| 2015/0228666 A1* | 8/2015 | Paolini, Jr. | G02F 1/167 |
| | | | 257/72 |
| 2015/0267907 A1 | 9/2015 | Thompson et al. | |
| 2015/0325598 A1 | 11/2015 | Pfeuffer et al. | |
| 2015/0354801 A1* | 12/2015 | Farrnbacher | F21V 23/06 |
| | | | 362/249.01 |
| 2017/0038794 A1* | 2/2017 | Song | G06F 1/1652 |
| 2017/0140679 A1* | 5/2017 | Tomoda | G09G 3/3208 |

* cited by examiner

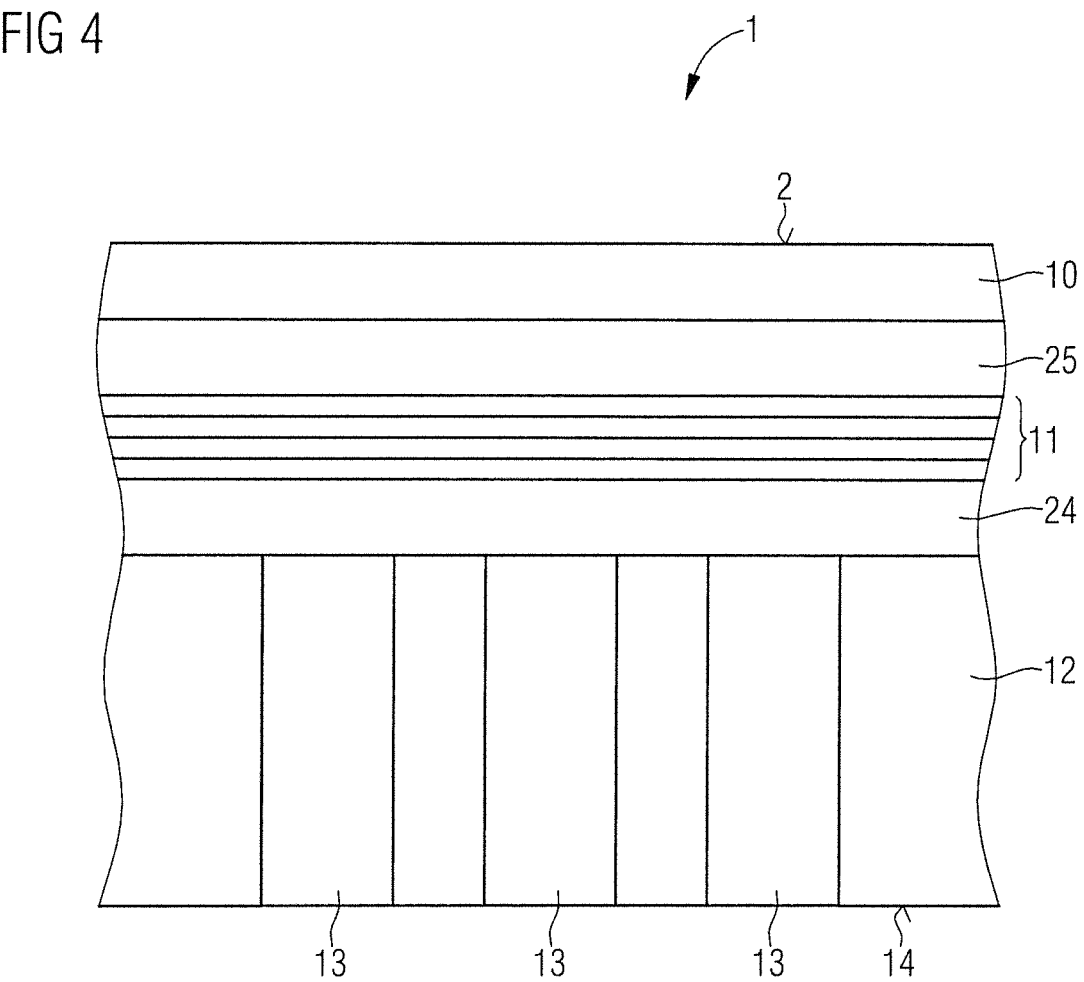

MODULAR MODULE

TECHNICAL FIELD

This disclosure relates to an arrangement comprising two modules and a method of producing an arrangement comprising at least two modules.

BACKGROUND

US 2014/0159043 A1 discloses an active matrix display, wherein light-emitting diodes are individually drivable with the aid of TFT transistor circuits. The display comprises a central region in which the light-emitting diodes are arranged. Moreover, free areas are provided on the display laterally at opposite sides, wherein control circuits that drive the TFT transistor circuits of the LEDs are provided in the free areas.

There is nonetheless a need to provide an improved module, an improved arrangement comprising at least two modules, and an improved method of producing an arrangement comprising at least two modules.

SUMMARY

We provide an arrangement including at least two modules for a video wall including light-emitting components arranged on a carrier, wherein a drive circuit that selectively drives the component at the carrier is provided for each component, row lines and column lines are provided, each drive circuit connects to a row line and a column line, each drive circuit connects to power supply lines, the carrier includes plated-through holes that guide the row lines and the column lines onto an underside of the carrier, the two modules are arranged on a further carrier, the further carrier includes at least one recess, an electrical connector is arranged in the recess, and the electrical connector connects column lines and/or row lines of the two modules to one another.

We also provide a method of producing an arrangement including at least the two modules for a video wall including light-emitting components arranged on a carrier, wherein a drive circuit that selectively drives the component at the carrier is provided for each component, row lines and column lines are provided, each drive circuit connects to a row line and a column line, each drive circuit connects to power supply lines, the carrier includes plated-through holes that guide the row lines and the column lines onto an underside of the carrier, the two modules are arranged on a further carrier, the further carrier includes at least one recess, an electrical connector is arranged in the recess, and the electrical connector connects column lines and/or row lines of the two modules to one another, the method including placing the modules next to one another such that at least two side faces of the two modules adjoin one another, wherein mutually assigned plated-through holes of the two modules adjoining one another electrically conductively connect to one another via an electrical connector, the electrical connector electrically connects column lines and/or row lines of the two modules to one another via the plated-through holes, and providing a further carrier including at least one recess at a top side, wherein the modules are placed by an underside onto the top side of the further carrier and secured to the further carrier, wherein the electrical connector is at least partly accommodated by the recess of the further carrier, and the modules laterally adjoin one another.

We further provide an arrangement including at least two modules for a video wall including light-emitting components arranged on a carrier, wherein a drive circuit that selectively drives the component at the carrier is provided for each component, row lines and column lines are provided, each drive circuit connects to a row line and a column line, each drive circuit connects to power supply lines, the carrier includes plated-through holes that guide the row lines and the column lines onto an underside of the carrier, the two modules are arranged on a further carrier, the further carrier includes at least one recess, an electrical connector is provided in the recess, the electrical connector connects column lines and/or row lines of the two modules to one another, the further carrier includes a further recess, a control circuit is provided in the further recess, the control circuit drives the drive circuits, the control circuit connects to column lines and row lines, at least two further modules are arranged on the further carrier, a respective module adjoins two other modules, the column lines and the row lines of the modules connect to one another via electrical connectors, the further carrier includes a respective recess in regions in which side edges of the modules adjoin one another, an electrical connector is arranged in the recess, an electrical connector connects column lines and/or row lines to one another, the further recess connects to two recesses, control lines of the control circuit are guided to the connectors of the two recesses and connect to column lines and to row lines of the modules, the control circuit is arranged in the further carrier below the modules, and the further carrier is configured in plate-shaped fashion.

BRIEF DESCRIPTION OF THE DRAWINGS

FIG. 4 shows a schematic cross section through a further example of a module.

LIST OF REFERENCE SIGNS

Figure 1:
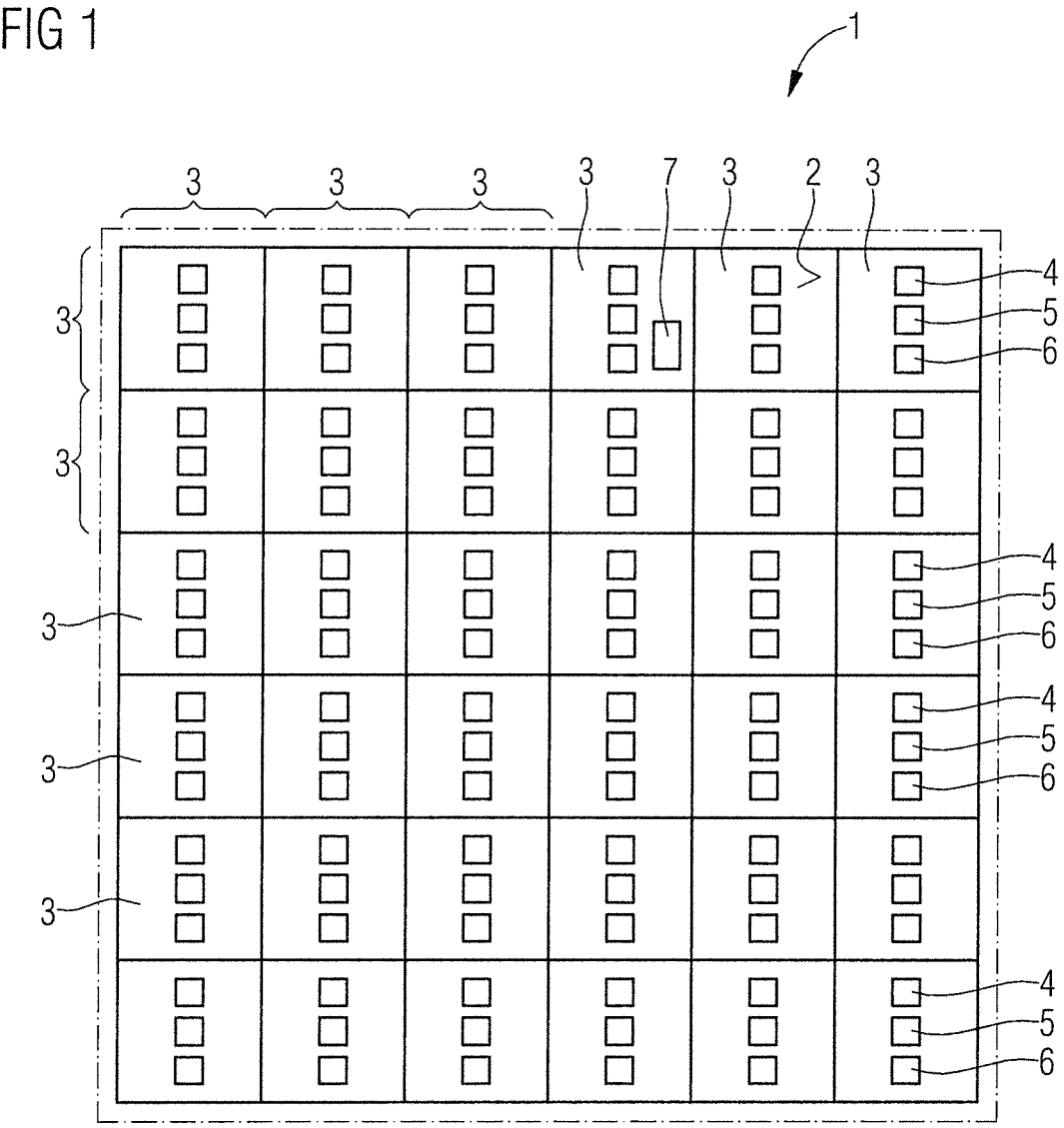
FIG. 1 shows a schematic illustration of a front side of a module.

1 module
2 front side
3 image pixel
4 first light-emitting component
5 second light-emitting component
6 third light-emitting component
7 drive circuit
8 first electrical line
9 second electrical line
10 component layer
11 circuit layer
12 carrier
13 plated-through hole
14 underside
15 first side edge
16 second side edge
17 third side edge
18 fourth side edge
19 first arrangement
20 second arrangement
21 third arrangement
22 fourth arrangement
23 fifth arrangement
24 first redistribution wiring layer
25 second redistribution wiring layer
26 module carrier
27 recess
28 top side of module carrier
29 connector
30 underside of module carrier
31 first channel
32 second channel
33 first electrical line
34 second electrical line
35 further recess
36 control electronics
41 first electrical terminal
42 second transistor
43 second electrical terminal
44 ground line
45 supply line
46 capacitor
47 gate terminal of second transistor
48 first transistor
49 column line
50 row line
51 column electronics
52 row electronics
53 digital-to-analog converter
54 buffer circuit
55 central electronics
56 gate terminal of first transistor
60 distance
61 contact pad
62 plug connector
63 cable
64 second plug connector
65 electrical line
66 potting compound
67 circuit board
68 conduction material
69 conductor track
70 flexible circuit board
71 line segment
72 first contact series
73 second contact series
74 side face

DETAILED DESCRIPTION

One advantage of our module is that light-emitting components and drive circuits are provided on a carrier. The carrier may be configured as a substrate. The drive circuits are arranged next to the components or between the components and a carrier. Moreover, the carrier comprises plated-through holes via which row lines and column lines of the module are guided onto an underside of the carrier. In this way, an entire surface area of the substrate may be provided with components and a control circuit to drive the drive circuits may be arranged in or below the carrier. As a result, it is possible to use as much surface area as possible to arrange the components.

As a result, in particular a marginless module may be provided, wherein substantially the entire surface area is used for the components. Consequently, in a plurality of modules being arranged next to one another, a uniformly bright surface is provided. Unilluminated intermediate areas between the modules may be avoided as a result.

The module may comprise a width and/or a length that are/is less than or equal to the number of image pixels along the width and/or respectively along the length multiplied by the width and/or respectively by the length of the image pixels. A marginless module may thus be provided.

Power supply lines of the components may also be guided via plated-through holes onto an underside of the carrier. Consequently, a power supply of the components may also be arranged below the carrier. As a result, surface area is saved and a modular module is provided in a simple manner.

The drive circuits may be configured in the form of TFT circuits that occupy little structural space. A compact construction of the module may thus be achieved. The TFT circuits may be arranged between the components on the top side of the module. Moreover, the TFT circuits may be arranged on the carrier and below the components. As a result, no surface area of the module is required on the radiation side of the module. Consequently, more area is available for the components.

The components may be configured as light-emitting diode chips. Light-emitting diode chips are suitable for providing light comprising different wavelengths comprising a high luminous flux in conjunction with a small design.

The arrangement comprises at least two modules arranged on a further carrier, wherein the further carrier comprises at least one recess. The further carrier constitutes a module carrier. An electrical connector is arranged in the recess of the further carrier, wherein the electrical connector connects column lines and/or row lines of the two modules to one another. In this way, a simple electrical coupling of the column lines and/or of the row lines is made possible without area being required. The electrical connectors may be configured, for example, in the form of plugs, electrical lines, in particular flexible electrical lines.

A multiplicity of modules may be arranged on the further carrier, wherein the column lines and the row lines of modules adjoining one another connect to one another via electrical connectors. As a result, an entire line matrix comprising column lines and row lines is provided for all modules. A simple electrical contacting of the row lines and of the column lines is possible as a result. With the aid of the modules, an arrangement, in particular a video wall comprising a plurality of modules may be provided, wherein the column lines and the row lines of the individual modules are driven with the aid of the control circuit. Consequently, by way of example, a video wall may be constructed simply and cost-effectively with the aid of individual modules. Moreover, when a module has a defect, the defective module may be exchanged for a new module. Simple repair of the video wall is thus possible.

The further carrier may comprise a further recess, wherein a control circuit is provided in the further recess. The control circuit is configured to drive the drive circuits of the light-emitting components. A compact construction is thus achieved, wherein the control circuit is arranged below the carrier in the further carrier. With the aid of this arrangement, a radiation surface of the arrangement is occupied solely by the modules. No surface regions are needed to arrange the control circuit. Moreover, the structural height of the arrangement is reduced by virtue of the control circuit being arranged in a recess of the further carrier. If the structural height of the arrangement is of lesser importance, then the control circuit may also be arranged on an underside of the further carrier. Larger video walls comprising an image area of a plurality of square meters may thus be produced. Moreover, the video walls may be controlled with the aid of an active matrix circuit (TFT). Multiplexing is not necessary. Smaller peak currents are thus achieved. Consequently, the components may comprise a smaller chip area. As a result, the modules with the matrix circuit are more cost-effective than with a passive control matrix.

With the aid of the modules, an arrangement, in particular a video wall comprising a plurality of modules, may be provided, wherein the column lines and the row lines of the individual modules are driven with the aid of the control circuit.

Plated-through holes may be provided for the power supply of the components in the carrier. Consequently, the components may be supplied with power from the underside of the carrier. The plated-through holes for the power supply of the components may be arranged in a dedicated surface region or jointly in a common surface region for the column lines or row lines.

The further carrier is configured in plate-shaped fashion and comprises a small thickness compared to the two-dimensional area extent. In one example, the further carrier does not project laterally beyond the modules secured on the further carrier. An arrangement is thus obtained which comprises substantially no or no lateral margin projecting beyond the margins of the modules. As a result, an arrangement is obtained whose radiation side is predefined by the modules alone. In this example, from module to module the pixel spacing of pixels of the two adjacent modules may remain constant even across the margin.

Electrical contacts may be provided on the underside of the carrier, the electrical contacts being electrically conductively connected to the plated-through holes, wherein at least one portion of the electrical contacts of the two modules electrically conductively connect to one another with the aid of the electrical connector. A simple and reliable electrical interconnection of the modules may be achieved as a result.

The electrical connector may connect to the contacts via a plug connector, in particular an SMD plug connector. The use of the plug connector enables simple and secure mounting of the electrical connector.

The electrical connector may comprise electrical lines, wherein the electrical lines electrically conductively connect to the contacts, and wherein the electrical lines are covered with an electrically insulating material or are embedded into an electrically insulating material. The electrical lines may be configured in the form of wires or conductor tracks. A simple electrical connector may be realized as a result.

The electrically insulating material may be arranged in an intermediate region between two side faces of the modules and on the modules between the contacts. A good embedding of the electrical lines may be achieved as a result. Moreover, the mechanical connection of the modules may be improved. Furthermore, the line routing may be improved in particular in the case of conductor tracks. The connector may be configured in the form of a circuit board comprising conductor tracks, wherein the conductor tracks connect electrical contacts of the two modules. Moreover, the circuit board may be configured as a flexible circuit board. A further advantageous connector may thus be provided.

The connector may be configured in the form of line segments, in particular in the form of solder balls, wherein the line segments are directly contacted with the contacts. In one example, the contacts may extend right onto side faces of the modules, wherein the line segments extend between the side faces in the region of the contacts arranged at the side faces. As a result, a simple construction of a connector is provided, which may be produced in a cost-effective and flexible manner.

The recess may extend over partial surfaces of at least two modules, in particular of three or more modules. Consequently, contacts of a plurality of modules may be contacted and possibly electrically conductively connected in one recess.

The modules may be arranged with marginal regions against one another, wherein the marginal regions are arranged at a distance, wherein the recess extends over the two entire marginal regions of the modules. An efficient electrical connection of the contacts of adjacent modules may be achieved as a result.

The recess may extend from a top side as far as an underside of the module carrier, wherein at least two recesses are provided, each recess is arranged above contacts of a different module, the electrical connector connects to the contacts of the two modules, and the electrical connector extends over an underside of the module carrier between the two recesses and electrically connects the electrical contacts of the two modules. In this way, contacts of many modules may be electrically interconnected in a simple manner.

The electrical connector may be arranged in a recess, wherein in particular the recess is open with respect to a top side of the carrier and closed with respect to an underside of the carrier. Protection of the connector vis-à-vis environmental influences is achieved as a result. Moreover, the stability of the module carrier is improved.

Furthermore, a method of producing an arrangement comprising at least two modules is provided, wherein the modules are placed next to one another such that at least two side edges of the two modules are assigned to one another. The lateral distance between the two modules is small. In particular, the two modules touch one another. The lateral distance may be less than 20% of a width of an image pixel. The mutually assigned plated-through holes of the two modules adjoining one another electrically conductively connect to one another via an electrical connector, wherein the electrical connector electrically connects column lines and/or row lines of the two modules to one another via the plated-through holes. A further carrier comprising at least one recess at a top side is provided, wherein the modules are placed by an underside onto the top side of the further carrier and are secured to the further carrier. Moreover, an electrical connector is accommodated by the recess of the further carrier.

The further carrier may comprise a further recess, wherein a control circuit is introduced into the further recess, the control circuit drives the drive circuits, and the control circuit connects to column lines and row lines of at least one module. A compact construction of the arrangement is thus made possible. Moreover, the control circuit is protected by the further carrier.

The above-described properties, features and advantages and the way in which they are achieved will become clearer and more clearly understood in association with the following description of examples explained in greater detail in association with the drawings.

FIG. 1 shows, in a schematic illustration, a plan view of a front side 2 of a module 1. The module 1 comprises a front side 2 with a rectangular area. The front side 2 is subdivided into image pixels 3, wherein each image pixel 3 is of the same size. In the example illustrated, the image pixels 3 are configured with a rectangular area and arranged in rows and columns. Six image pixels 3 are arranged in a row. Likewise six image pixels 3 are arranged in a column. The module 1 thus comprises a total of 36 image pixels. Each image pixel 3 comprises at least one light-emitting component 4, 5, 6. Each image pixel 3 comprises three light-emitting components 4, 5, 6. The first light-emitting component 4 is configured to provide red light. The second light-emitting component 5 is configured to provide green light. The third light-emitting component 6 is configured to provide blue light. With the aid of the red, green and blue light of the light-emitting components 4, 5, 6, it is possible to represent any arbitrary color of the color space for an image pixel 3. Moreover, an image pixel 3 may, e.g., also comprise just one light-emitting component comprising one wavelength.

The module 1 may comprise fewer or more image pixels. Moreover, it is not necessary for an identical number of image pixels to be arranged in a row and in a column. By way of example, the module 1 may also comprise a rectangular area, wherein the number of image pixels of the rows is greater than the number of image pixels of the columns. However, it is advantageous if all rows comprise the same number of image pixels. Moreover, it is advantageous if all columns comprise the same number of image pixels. An image pixel 3 may also comprise more or fewer light-emitting components. Moreover, the light-emitting components of the image pixel 3 may also emit other colors. The light-emitting components may be configured as light-emitting diodes. By way of example, the light-emitting components may be configured as thin-film chips, as volume emitter diodes, as sapphire flip-chips, as micro-LED chips, as epitaxial chips, as OLED. Moreover, the light-emitting components 4 may comprise electrical contacts for operation on the top side, the underside or on the top side and the underside.

Drive circuits 7 provided, for example, for each light-emitting component 4 may be arranged on the front side of the module 1 between the light-emitting components 4, 5, 6 or below the light-emitting components 4, 5, 6. Only one drive circuit 7 is illustrated schematically in FIG. 1. For an electrical connection between the electrical contacts of the light-emitting components 4, 5, 6 and the drive circuits 7, corresponding electrical lines are formed, which are not illustrated in the figure. The module 1 comprises a module width which is, for example, less than or equal to the number of image pixels along the module width, i.e., in a row, multiplied by the width of an image pixel. Moreover, the module 1 may comprise a module length along the columns which is, for example, less than or equal to the number of image pixels along the module length, i.e., in a column, multiplied by the length of an image pixel. Consequently, the module width is less than or equal to the sum of the image pixel widths. Moreover, the module length is less than or equal to the sum of the module pixel lengths. A very compact construction of the module 1 is made possible as a result.

Figure 2:
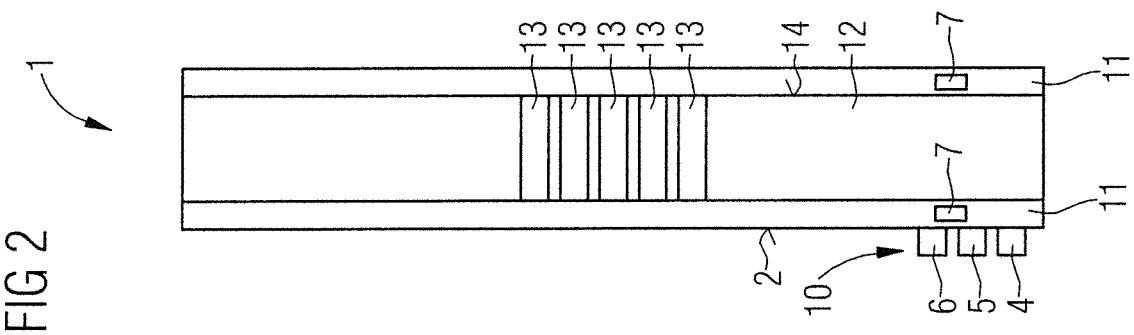
FIG. 2 shows a schematic cross section through the module.

FIG. 2 shows a schematic cross section through the module 1 from FIG. 1, wherein the light-emitting components 4, 5, 6 are arranged in a component layer 10 on the front side 2. Only three components 4, 5, 6 are illustrated for the sake of a clear illustration. In this example, the component layer 10 is arranged on a circuit layer 11. The circuit layer 11 comprises drive circuits 7 for the light-emitting components 4, 5, 6. A drive circuit 7 may be provided for each component so that the components are individually drivable. The drive circuits 7 comprise transistors, in particular field effect transistors, and capacitors as well. Moreover, column and row lines are provided in the circuit layer 11 such that the drive circuits are individually drivable in the form of an active matrix circuit. Moreover, the circuit layer 11 may also comprise power supply lines for the components. The circuit layer 11 may comprise redistribution wiring layers between the components and the drive circuits and/or between the drive circuits and a carrier 12. The carrier 12 is configured in plate-shaped fashion and may comprise the same area as the front side 2 of the module 1. The carrier 12 constitutes a substrate that may consist of inorganic or organic material. By way of example, the carrier 12 may consist of glass, PMMA, paper, Ormocer, silicone, ceramic, silicon, PCB, flexible material (PI, PET), metal, steel, high-grade steel, copper, aluminum and the like. From the circuit layer 11, electrically conductive plated-through holes 13 are guided through the carrier 12 onto an underside 14 of the carrier 12. The plated-through holes 13 connect to the drive circuits 7. Moreover, the plated-through holes 13 may also connect to power supply lines of the components. Five plated-through holes 13 are illustrated by way of example in the cross section illustrated in FIG. 2. The plated-through holes 13 comprise electrically conductive material. If the carrier 12 consists of an electrically conductive material, then the plated-through holes 13 may be surrounded with an electrical insulation layer to electrically insulate the plated-through holes 13 from the carrier 12. The circuit layer 11 comprising the at least one drive circuit 7 may also be arranged on the underside 14. Moreover, a circuit layer 11 comprising the drive circuits 7 may be provided both on the front side 2 and on the underside 14.

Figure 3:
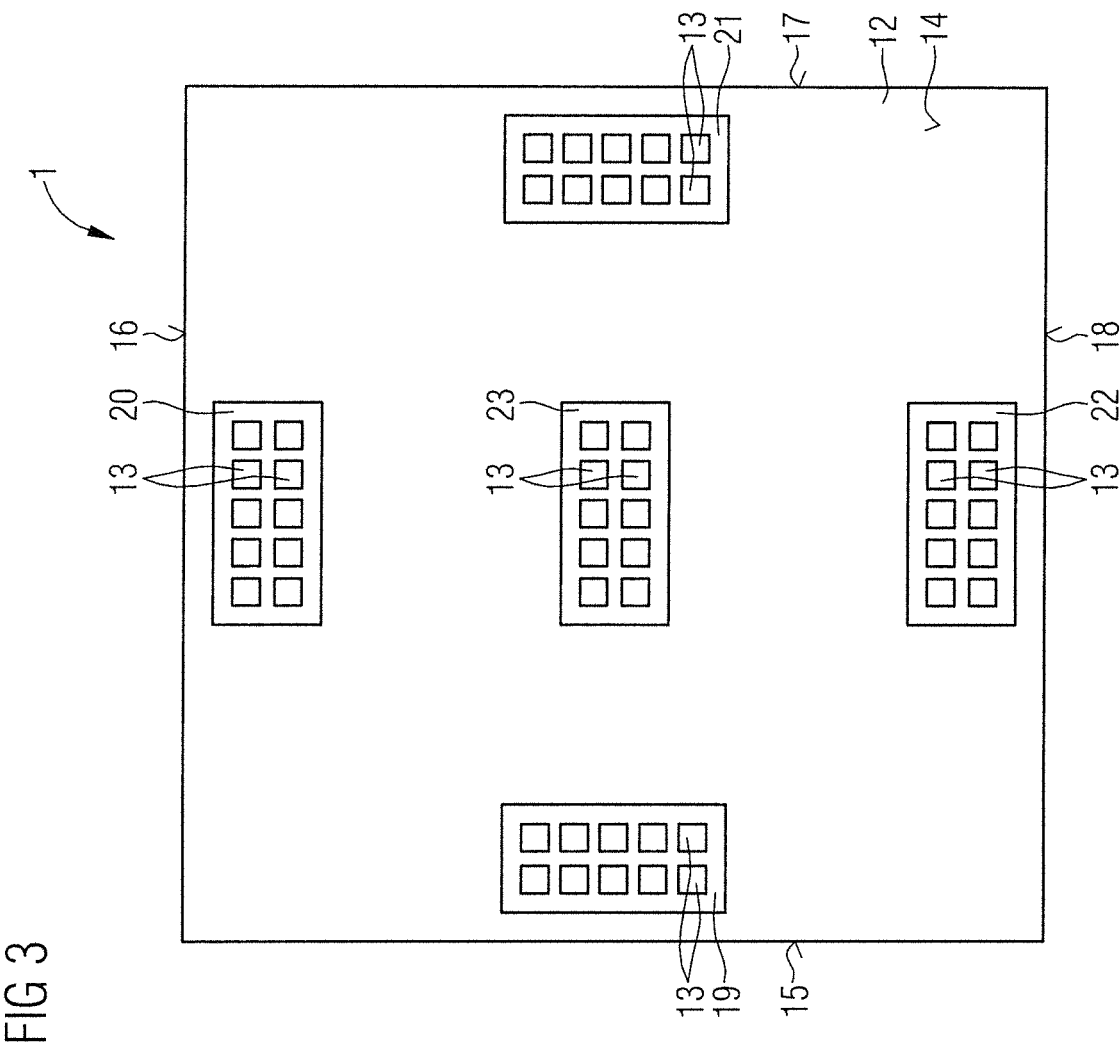
FIG. 3 shows a schematic illustration of an underside of a module.

FIG. 3 shows the underside 14 of the carrier 12 from FIG. 2 without a further circuit layer 11. On the underside 14 of the carrier 12, arrangements of plated-through holes 13 are provided in a manner adjoining side edges 15, 16, 17, 18 of the carrier 12. In the example illustrated, an arrangement 19, 20, 21, 22 of plated-through holes 13 is provided centrally with respect to a side edge 15, 16, 17, 18. Each arrangement 19, 20, 21, 22 comprises two series of plated-through holes 13. Each series comprises five plated-through holes 13. More or fewer arrangements 19, 20, 21, 22 of plated-through holes 13 may also be provided. Moreover, each arrangement may comprise more or fewer series and more or fewer plated-through holes 13. A lateral distance of the plated-through holes 13 with respect to the side edges 15, 16, 17, 18 of the carrier 12 may be small, in particular less than one tenth of the side edge of the carrier 12. A carrier 12 may comprise, for example, an area of 50 mm×100 mm to 1000 mm×700 mm.

Moreover, the carrier 12 comprises a fifth arrangement 23 of plated-through holes 13, wherein the fifth arrangement 23 is arranged centrally on the underside 14 of the carrier 12 in the example illustrated. The fifth arrangement 23 of plated-through holes may be provided optionally, for example, and feed an electrical supply voltage of the components and the drive circuits. The first and third arrangements 19, 21 of the plated-through holes 13 serve for the electrical connection to row lines of the module 1. The second and fourth arrangements 20, 22 of the plated-through holes 13 serve for the electrical contacting of column lines of the module 1 in the example illustrated. The arrangements of the plated-through holes may also differently electrically conductively connect to the column and row lines of the circuit layer 11. Moreover, the first, second, third and fourth arrangements 19, 20, 21, 22 comprising plated-through holes 13 may also comprise individual plated-through holes 13 for the voltage supply.

FIG. 4 shows a schematic enlarged cross section through one example of a module 1. A first redistribution wiring layer 24 is arranged on the carrier 12. The circuit layer 11 is arranged on the first redistribution wiring layer 24, wherein the circuit layer 11 may be formed from a multiplicity of layers to enable a simple and cost-effective construction of the field effect transistors and capacitors. A second redistribution wiring layer 25 is arranged on the circuit layer 11. The component layer 10 comprising the light-emitting components that are not explicitly illustrated is arranged on the second redistribution wiring layer 25. The first redistribution wiring layer 24 electrically connects the drive circuits 7 to the plated-through holes 13 arranged in the carrier 12 and are guided to the underside of the carrier 12. The second redistribution wiring layer 25 serves for electrical connection between the electrical terminals of the light-emitting components 4, 5, 6 of the component layer 10 and the drive circuits 7 of the circuit layer 11. One redistribution wiring layer may be sufficient for the redistribution wiring of the contacts. Moreover, the first redistribution wiring layer 24, the circuit layer 11 and possibly the second redistribution wiring layer 25 may also be arranged on the underside 14. The carrier 12 may be provided with at least one redistribution wiring layer 24, a circuit layer 11 and a component layer 10 on both sides.

Figure 5:
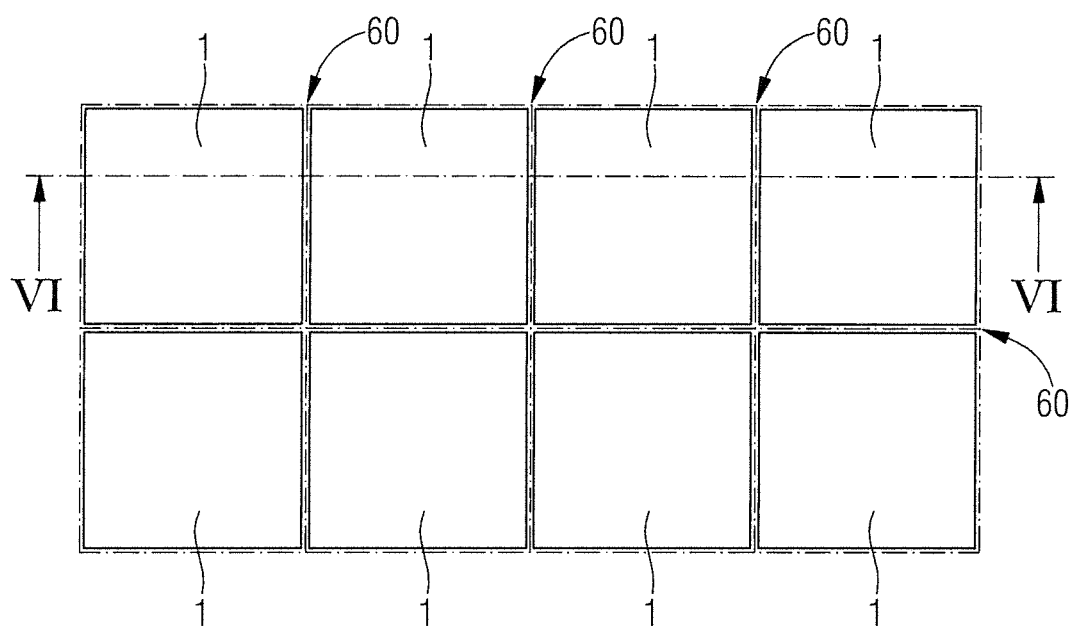
FIG. 5 shows an excerpt from an arrangement of a plurality of modules adjoining one another.

FIG. 5 shows, in a schematic illustration, a partial excerpt from an arrangement of a multiplicity of modules 1 configured, for example, in accordance with FIGS. 1 to 4. The arrangement may constitute, e.g., a video wall. The modules 1 are configured in square fashion and arranged next to one another in rows and columns. Only four columns and two rows are illustrated in the excerpt illustrated. By way of example, a module may comprise an edge length of 100 mm×100 mm. Moreover, a module may comprise, for example, 5×5 image pixels, but also 50×100 image pixels. The modules 1 adjoin one another with assigned side edges in a marginless manner. The lateral distance 60 between two modules 1 in a row and/or a column may be small. In particular, the lateral distance 60 may be less than 20% of a side length of an image pixel, in particular less than 10% of a side length of an image pixel, or smaller.

Figure 6:
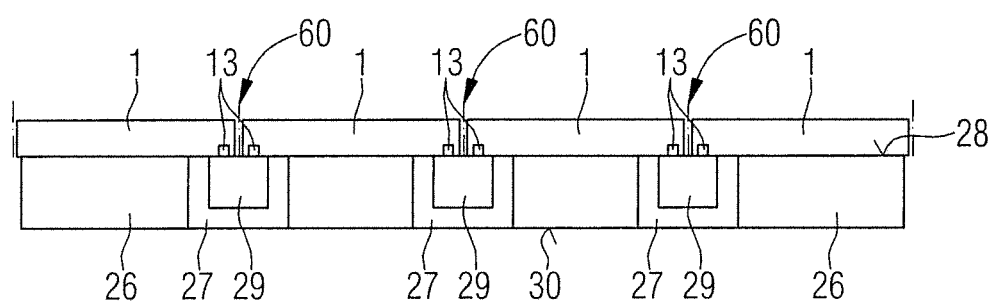
FIG. 6 shows a cross section through the arrangement from FIG. 5.

FIG. 6 shows a cross section A/A through FIG. 5. The modules 1 are arranged on a module carrier 26 that constitutes a further carrier. The module carrier 26 comprises recesses 27. The recesses 27 are introduced in a top side 28 of the module carrier 26 and comprise electrical connectors 29. The electrical connectors 29 electrically conductively connect to the plated-through holes 13 of adjacent modules 1. Only a few plated-through holes 13 are illustrated schematically. Four modules 1 are illustrated in the example illustrated, wherein the connectors 29 electrically connect the row lines of the four modules 1 to one another. The electrical connectors 29 may be configured in the form of plugs, electrical lines, electrical wires or elastic lines. In this example, a respective electrical plated-through hole 13 of a module 1 may electrically conductively connect to an electrical plated-through hole 13 of an adjacent module 1. The modules 1 may be configured identically. With the aid of the connectors 29, both the column lines and the row lines of the modules individually connect to one another. Consequently, an arrangement comprising a multiplicity of modules 1 is provided, wherein the column lines along the columns of a plurality of modules and row lines along the rows of a plurality of modules electrically conductively connect to one another. The recesses 27 may extend as far as an underside 30 of the module carrier 26. A small structural height of the arrangement is achieved by virtue of the arrangement of the connectors 29 in the recesses 27. The modules 1 are secured on the module carrier 26, wherein the modules 1 connect to the module carrier 26, for example, by way of an adhesive connection, a soldering connection, a screw connection or a clamping connection. Furthermore, a plurality of module carriers 26 comprising modules may be combined to form a larger video wall. The term video wall is understood to mean any type of optical indicator and any type of display.

Figure 7:
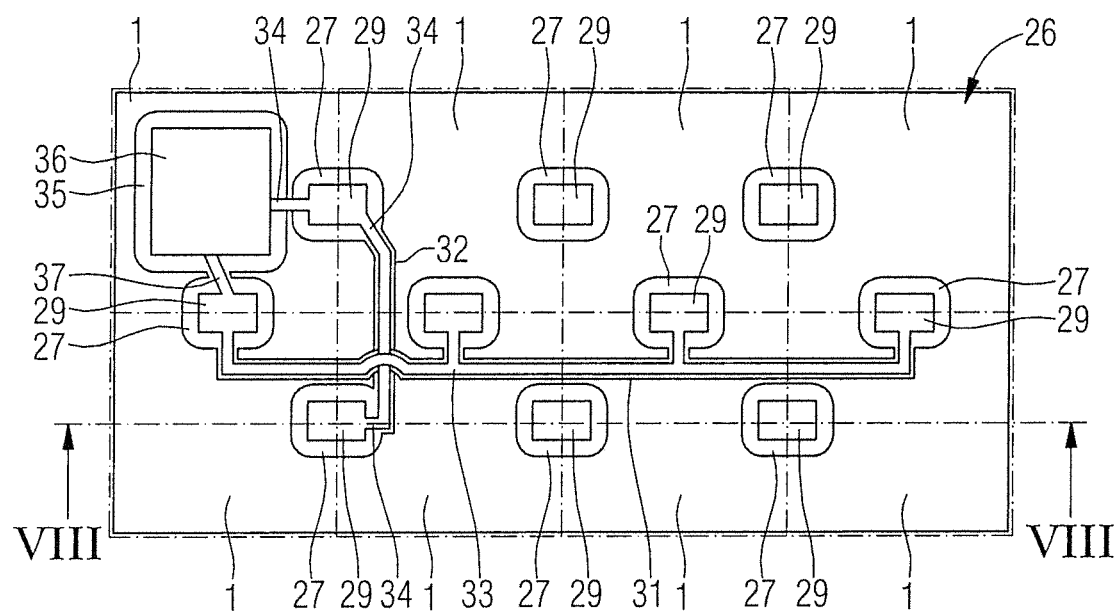
FIG. 7 shows a partial excerpt from an underside of the carrier.

FIG. 7 shows a partial excerpt from an underside 30 of the module carrier from FIGS. 5 and 6. The modules 1, not visible from below, are indicated schematically by dashed lines. The module carrier 26 comprises a plurality of recesses 27 in which electrical connectors 29 are respectively arranged. Moreover, channels 31, 32 are provided that connect some of the recesses 27 to one another. Electrical lines 33, 34 are arranged in the channels 31, 32. First electrical lines 33 are provided in the first channel 31 and electrically conductively connect four electrical connectors 29 to one another. Furthermore, second electrical lines 34 are arranged in the second channel 32 and electrically conductively connect two electrical connectors 29 to one another. Moreover, a further recess 35 is provided, in which control electronics 36 are arranged. The control electronics 36 connect to the two electrical lines 33, 34. The connectors 29 connected to the first lines 33 connect row lines of the modules 1. The connectors 29 connected to the second lines 34 connect column lines of the modules 1. The second electrical lines 34 thus comprise the same number of electrical lines as the number of row lines that the modules 1 comprise. The first electrical lines 33 thus comprise the same number of lines as the number of column lines that the modules 1 comprise. A compact construction of the arrangement comprising a small structural height is achieved by virtue of the arrangement of the control electronics 36 in the further recess 35 of the module carrier 26. This is advantageous in particular in the configuration of a video wall. The control electronics 36 and the connectors 29 comprise a smaller height than the recesses 27, 35 such that the control electronics and the connectors do not project beyond the module carrier 26.

Figure 8:
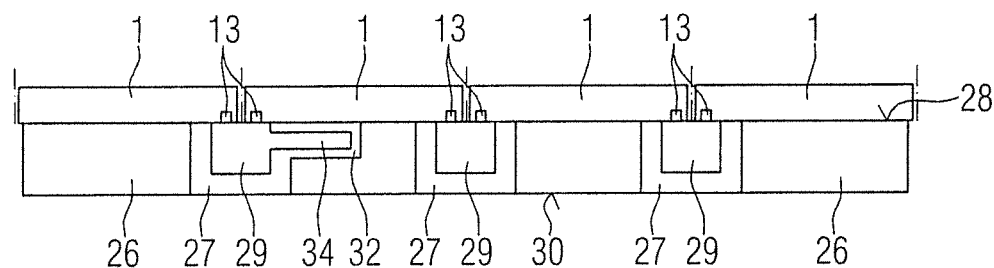
FIG. 8 shows a cross section through the partial excerpt from FIG. 7.

FIG. 8 shows a schematic cross section A-A through the arrangement from FIG. 7.

Figure 9:
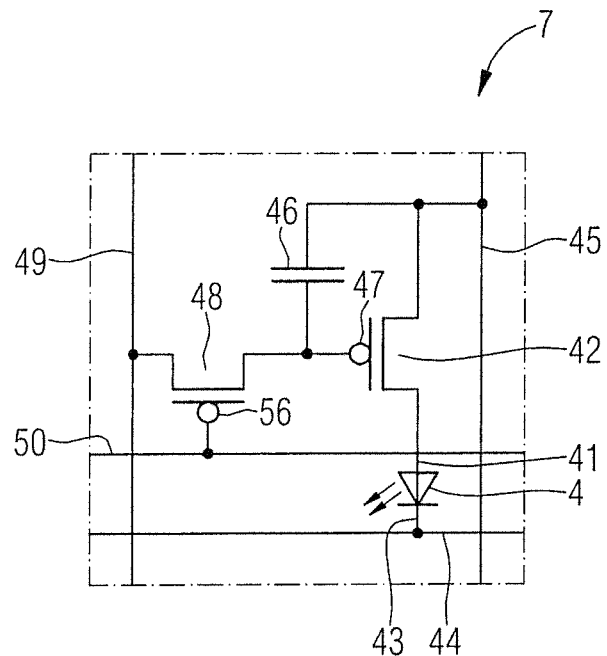
FIG. 9 shows a simplified electrical equivalent circuit diagram for a drive circuit of a light-emitting component.

FIG. 9 shows, in a schematic illustration, an electrical equivalent circuit diagram for the drive circuit 7 for a light-emitting component 4. A first electrical terminal 41 of the light-emitting component 4 connects to a second transistor 42. A second electrical terminal 43 of the light-emitting component 4 connects to a ground line 44. An input of the second transistor 42 connects to a supply line 45. The supply line 45 provides a positive voltage. Furthermore, a capacitor 46 connects between the input of the second transistor 42 and a gate terminal 47 of the second transistor 42. Furthermore, the gate terminal 47 of the second transistor 42 connects to a column line 49 via a first transistor 48. Moreover, a gate terminal 56 of the first transistor 48 connects to a row line 50. Each of the light-emitting components of the modules described is supplied with power by a drive circuit 7 depending on the driving of the column line 49 and of the row line 50.

Figure 10:
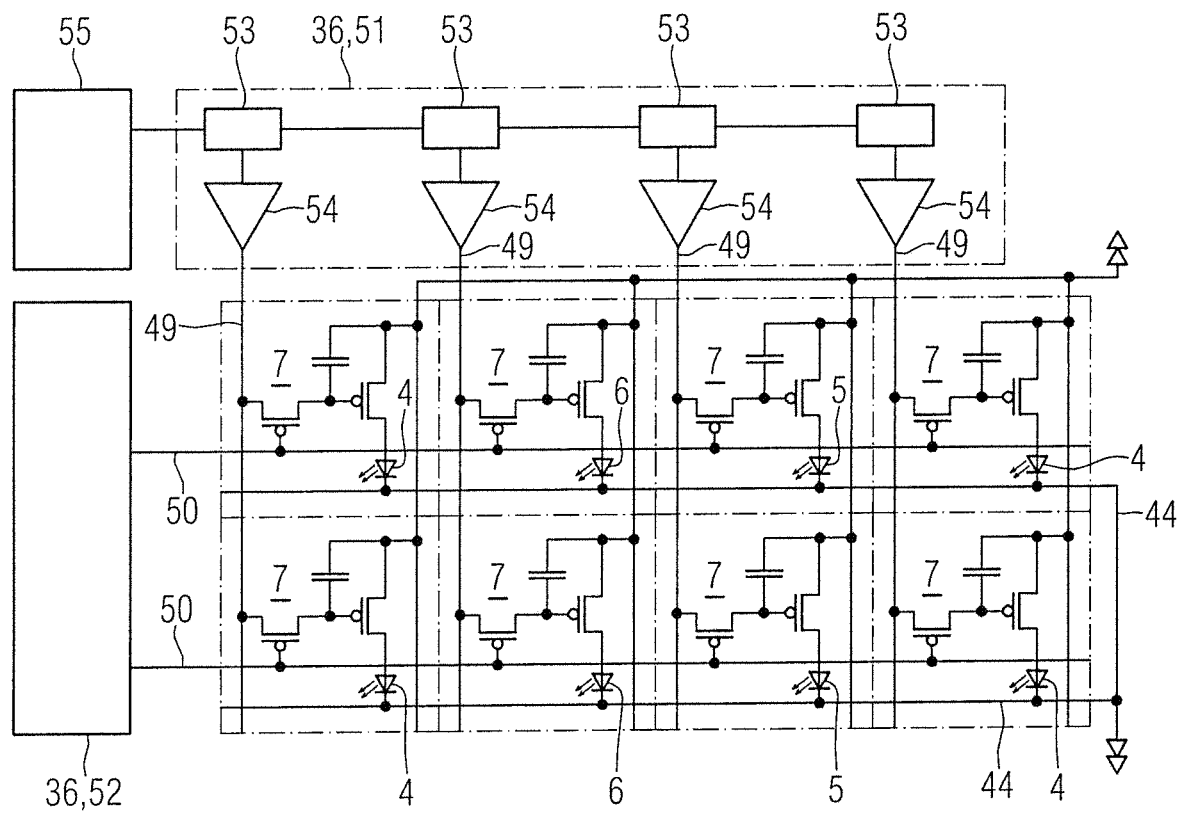
FIG. 10 shows a schematic partial view of an electrical equivalent circuit with control circuit and drive circuits.

FIG. 10 shows, in a schematic illustration, one possible construction of the electronic circuit comprising the control electronics 36, wherein the control electronics 36 comprise column electronics 51 and row electronics 52. The column electronics 51 connect to the column lines 49 of the drive circuits 7. The row electronics 52 connect to the row lines 50 of the drive circuits 7. Furthermore, the ground lines 44 of the drive circuits 7 connect to one another and to ground. Moreover, the supply lines 45 of the drive circuits 7 connect to one another and connect to a voltage supply. The column electronics 51 may comprise digital-to-analog converters 53 connected to the column lines 49 via buffer circuits 54. The row electronics 52 may comprise shift registers and multiplexers. By way of example, an analog voltage may be present on the column line 49. On the row line 50, the first transistor is opened and closed by way of a voltage pulse, wherein the first transistor in turn opens the second transistor. Both the column electronics and the row electronics may connect to central electronics 55. The central electronics 55 are configured, for example, as a graphics processor. Both the column electronics 51 and the row electronics 52 may comprise a different construction to be able to individually drive the individual drive circuits 7 of the light-emitting components 4, 5, 6.

The electrical connectors 29 connect the row lines of adjacent modules. Moreover, the electrical connectors connect the column lines of adjacent modules. The first and second electrical lines 33, 34 and the connecting lines 37, 38 serve as collective lines that electrically conductively connect control electronics to the column lines and the row lines of the modules. The drive circuits 7 connect to the column lines and the row lines, as was explained with reference to FIGS. 9 and 10. The control electronics 36 thus connect to each individual column line and each individual row line of the arrangement.

For reasons of efficiency, specific types of light-emitting components, for example, components that emit red light, may be supplied with a lower supply voltage. For this purpose, separate supply lines may be provided for the selected components. The buffer circuits are configured, for example, as voltage followers to decouple the column line from the digital-to-analog converter so that the voltage of the digital-to-analog converters is not altered by the load of the voltage lines. The row electronics are configured, for example, to address specific rows, in particular only one row.

With the aid of the drive circuits 7 proposed, it is possible to energize the individual light-emitting components permanently for a specific time. Consequently, in contrast to multiplexing operation with components of lower light intensity, a higher light brightness may be provided. Low brightness requirements thus lead to lower currents. Moreover, smaller light-emitting components may be used. Furthermore, an image represented with the aid of the modules becomes smoother on account of the absence of multiplexing. Furthermore, all cathodes of the light-emitting components may connect to a common ground potential. As a result, the construction is simplified because patterning of the cathode contacts is not necessary. Complex phototechnology may thus be obviated.

Figure 11:
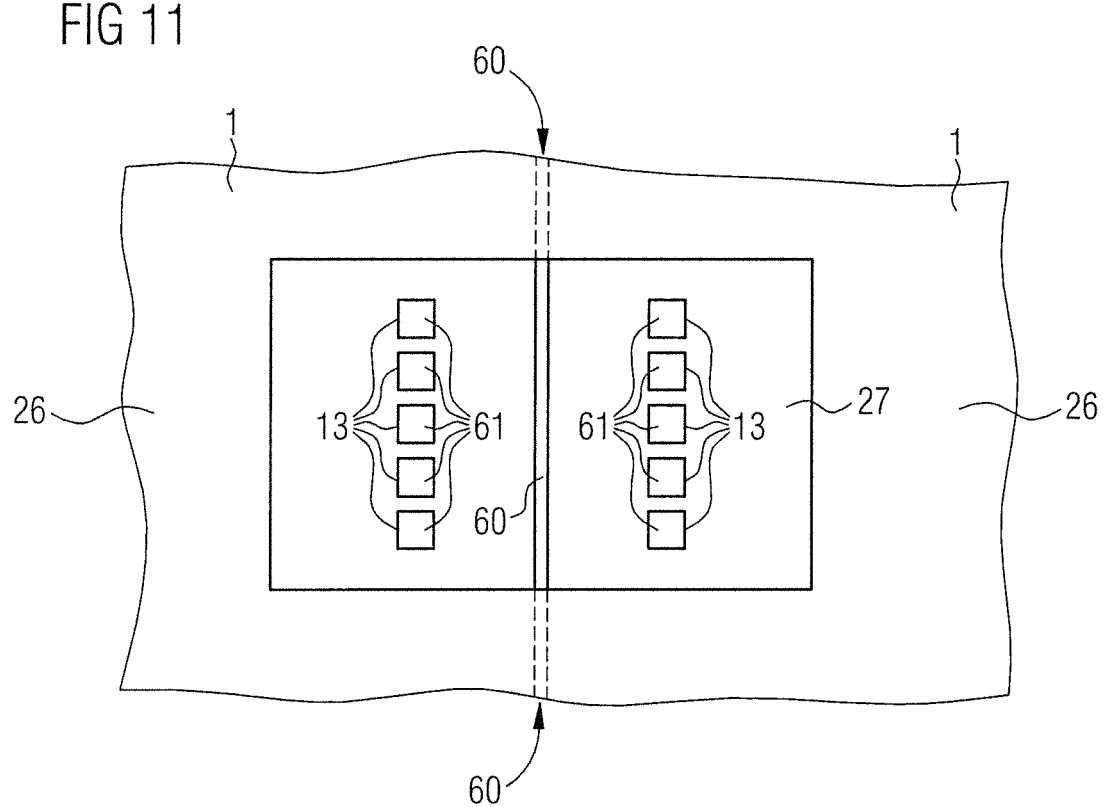
FIG. 11 shows a partial excerpt from a display comprising modules arranged on a module carrier.

FIG. 11 shows a schematic plan view of an underside of one example of an arrangement configured in accordance with FIGS. 5 and 6. An enlarged excerpt from a recess 27 of the module carrier 26 is shown here without a connector 29 being illustrated. The recess 27 extends from the top side of the module carrier 26 as far as an opposite underside of the module carrier 26 and is thus configured as a through hole. The recess 27 is arranged in the region of electrical contact pads 61 of two modules 1 adjoining one another. In the example illustrated, the two modules 1 adjoin one another at a distance 60 and at the same time are fixedly connected to the module carrier 26. Each module 1 comprises a series of electrical contact pads 61. The electrical contact pads 61 may directly or indirectly connect to the electrical plated-through holes 13. The electrical contact pads 61 constitute electrical terminals for the driving and/or power supply of the light-emitting components of the modules 1.

Figure 12:
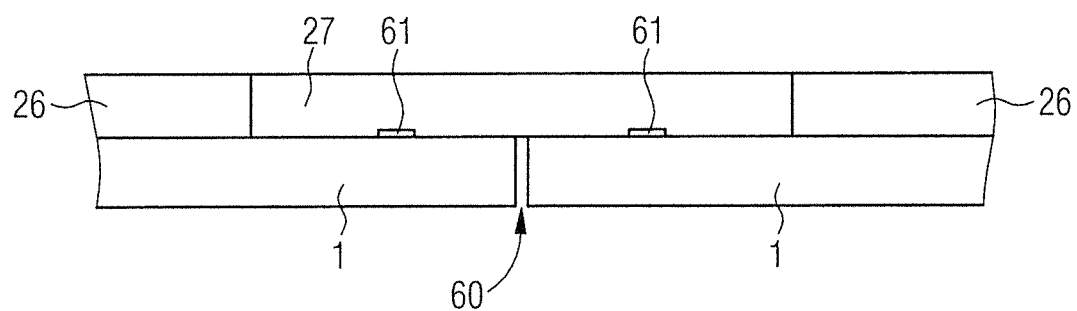
FIG. 12 shows a schematic cross section through the arrangement from FIG. 11.

FIG. 12 shows a schematic cross section through the arrangement from FIG. 11. The electrical contact pads 61 may be realized by end faces of the electrical plated-through holes or separately applied electrical contact pads that are constituted from an electrically conductive metal, for example, and electrically conductively connect to the plated-through holes. In the example illustrated, each module 1 comprises one series of five electrical contact pads 61. More or fewer contact pads 61 may also be provided for a module 1.

Figure 13:
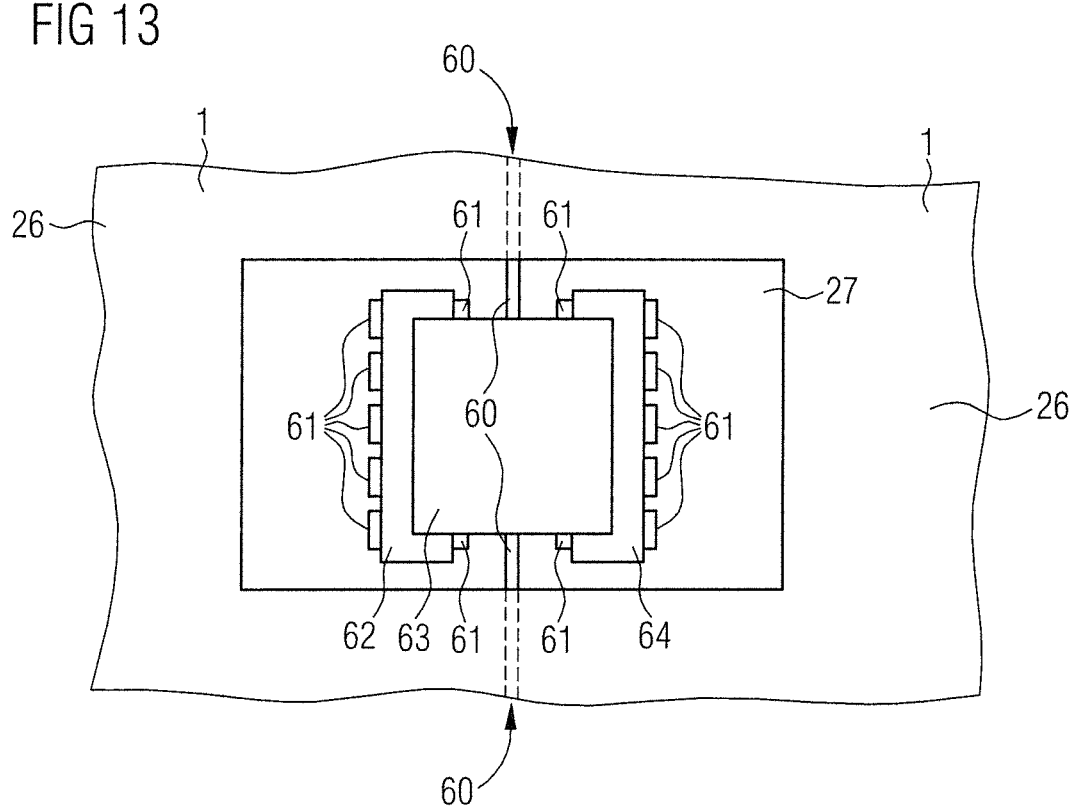
FIG. 13 shows a partial excerpt from a further example of modules arranged on a module carrier, wherein the electrical connector comprises a cable.

FIG. 13 shows a plan view of an arrangement configured substantially in accordance with FIG. 11, wherein the electrical contact pads 61 connect via an electrical connector in the form of a cable 63 with plug connectors 62, 64. The cable 63 may, for example, be configured as a ribbon cable and comprise an electrical line for each pair of electrical contact pads 61 of the two modules. Each contact pad 61 of one module 1 may connect to an opposite contact pad 61 of the opposite module 1. The plug connectors 62 are configured as SMD plug connectors, for example. In this example, a plug connector 62 may comprise a plug and a socket, wherein, for example, each socket connects to the module 1 and the plug is secured to the cable 63.

Figure 14:
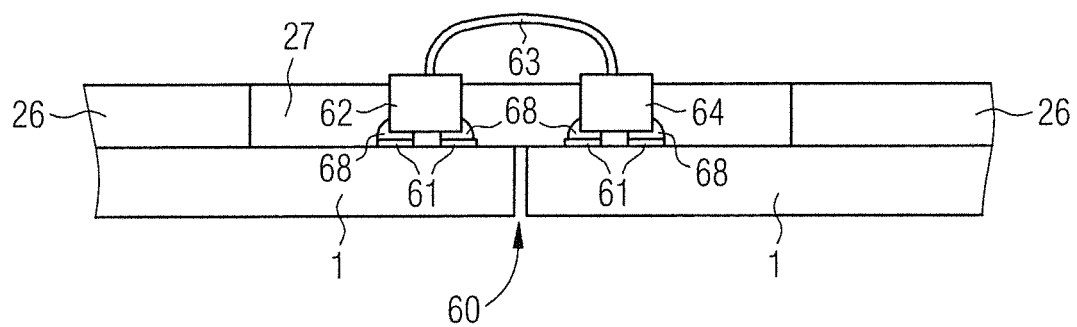
FIG. 14 shows a schematic cross section through the arrangement from FIG. 13.

FIG. 14 shows a cross section through the arrangement from FIG. 13. The connection of the plug connector 62, 64 to the module 1 may be realized, for example, with the aid of an adhesive connection or with the aid of a solder connection or with the aid of some other electrical conduction material 68. The two-part configuration of the plug connector 62, 64 makes it possible for the cable 63 to be released and respectively mounted in a simple manner. In the example illustrated, each module 1 comprises two series of contact pads 61. A module 1 may also comprise just one series of contact pads 61, as was explained on the basis of the example from FIG. 11.

The cable 63 may be configured as a ribbon cable. Instead of the ribbon cable, any other type of cable 63 may also be used to connect the electrical contact pads 61 of the two modules 1 to one another. By way of example, individual electrical lines, in particular line wires of the cable 63, may connect to the electrical contact pads 61 of the modules via the plug connectors 62, 64.

Figure 15:
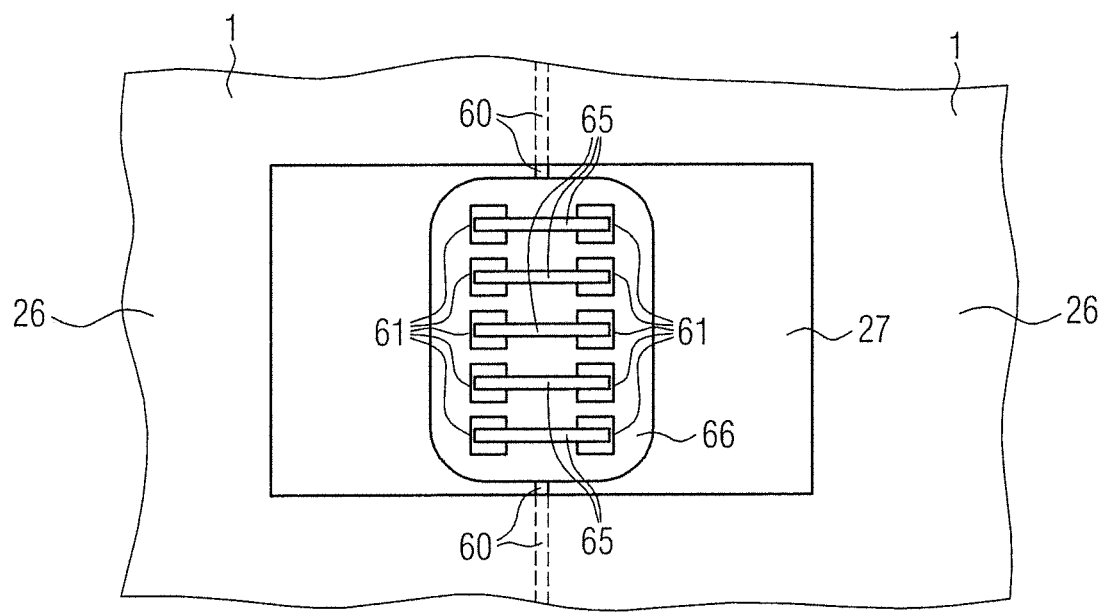
FIG. 15 shows a schematic partial excerpt from a further example of an arrangement comprising modules, wherein electrical lines in the form of wires are provided as electrical connectors.

FIG. 15 shows, in a plan view, an arrangement in accordance with FIG. 11 with a further example of an electrical connector for the two modules 1. The excerpt in the illustration in FIG. 15 is chosen in accordance with FIG. 11, although in this example the contact pads 61 of the two modules directly connect via electrical lines 65. In this example, a respective contact pad 61 of one module 1 electrically conductively connects to an opposite contact pad 61 of the other module 1. The electrical lines 65 may be configured, for example, in the form of wires, in particular in the form of bond wires. An electrical and mechanical connection between the wires and the contact pads 61 may be carried out, for example, by way of an aluminum wedge-wedge bond. It is also possible to use other techniques for connection between the electrical line and the contact pad. In the example illustrated, the contact pads 61 and the electrical lines 65 are covered with a potting compound 66. The potting compound 66 consists of an electrically insulating material, for example, epoxy material. By the potting compound, the electrical lines 65 and the contact pads 61 are protected vis-à-vis environmental influences, in particular vis-à-vis mechanical damage. The potting compound 66 may also be dispensed with.

Figure 16:
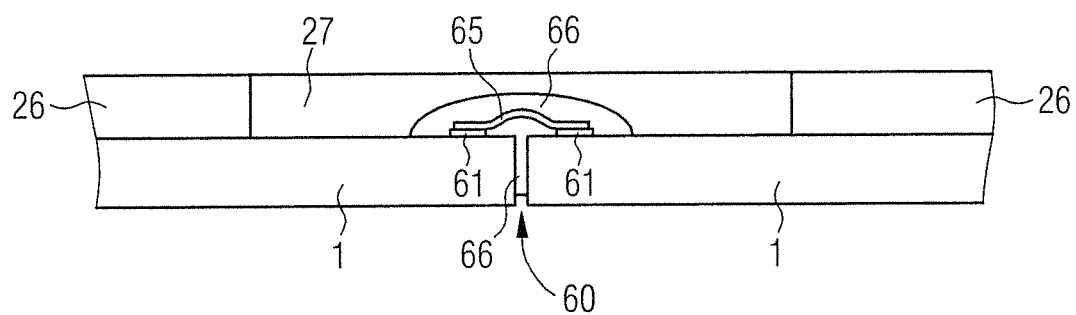
FIG. 16 shows a cross section through the arrangement from FIG. 15.

FIG. 16 shows a cross section through the arrangement from FIG. 15. In this example, it may be discerned that the potting compound 66 is also arranged in a gap region constituted by the distance 60 between two side faces of the modules 1. Secure and reliable embedding of the electrical lines 65 into the potting compound 66 is achieved in this way.

Figure 17:
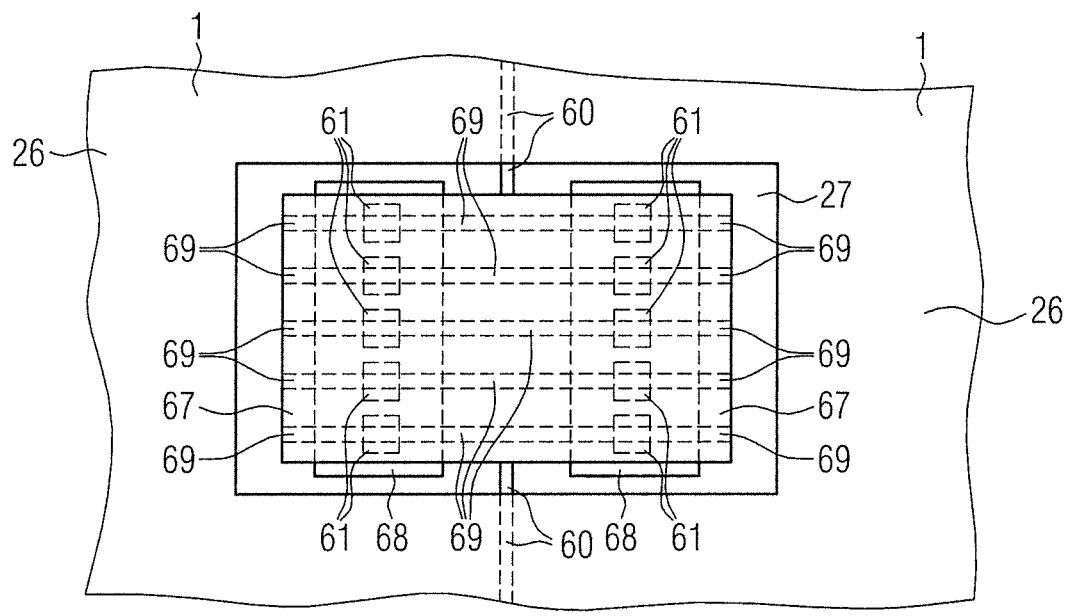
FIG. 17 shows a partial excerpt from a further example of modules arranged on a module carrier, wherein contacts of adjacent modules are electrically connected with the aid of a circuit board.
Figure 18:
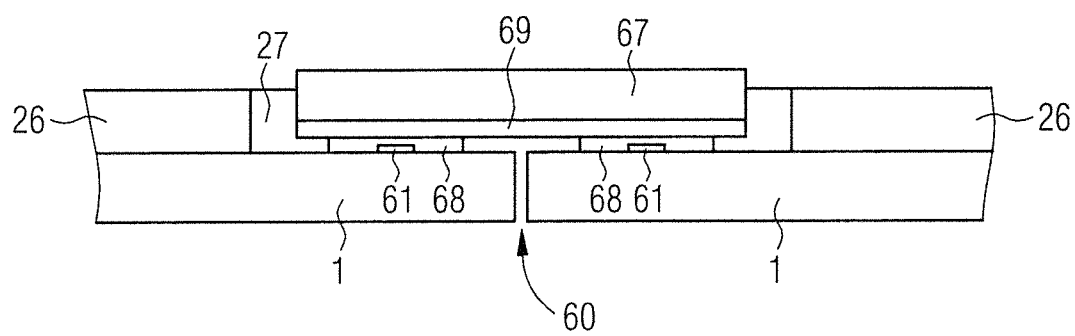
FIG. 18 shows a cross section through the arrangement from FIG. 17.

FIG. 17 shows a schematic plan view of an arrangement in accordance with FIG. 11, which includes an electrical connector. In this example, the electrical connector is realized in the form of a circuit board 67. The circuit board 67 comprises electrical conductor tracks 69 on a side facing the modules, the electrical conductor tracks connecting the electrical contact pads 61 of the two modules 1 to one another. For this purpose, the electrical conductor tracks 69 are arranged substantially parallel to one another and formed on a straight line between two opposite contact pads 61 of the two modules 1. The circuit board 67 is preferably completely accommodated in the recess 27. FIG. 18 shows a cross section through the arrangement from FIG. 17. In this example, it may be discerned that the conductor tracks 69 are arranged on the side of the circuit board 67 facing the modules 1. An electrically conductive connection between the contact pads 61 and the conductor tracks 69 may be produced with the aid of an electrically conductive conduction material 68. The conduction material 68 may be applied, for example, in pasty or liquid form. A defined amount of conduction material 68 may be applied on each contact pad 61 and then the circuit board 67 may be placed onto the conduction material accumulations 68. The conduction material 68 may additionally carry out a mechanical securing of the circuit board 67. An anisotropically conductive conduction material 68 may be used. A continuous strip of conduction material 68 may be applied on the series of contact pads 61 of a module 1. As a result, the applying process is simplified since conduction material 28 need not be applied and apportioned separately for each contact pad 61. The anisotropic conductivity prevents a short circuit or an electrical conduction connection between adjacent contact pads 61. Afterward, the circuit board 67 is placed onto the two strips of conduction materials 68. This example is also illustrated in cross section in FIG. 18. By virtue of the anisotropic conductivity of the conduction material 68, only an electrically conductive connection between the contact pad 61 and the conductor track 69 arranged thereabove is produced. The anisotropic conductivity of the conduction material 68 ensures that the conductivity is then produced in a perpendicular direction with respect to the plane of the modules.

Figure 19:
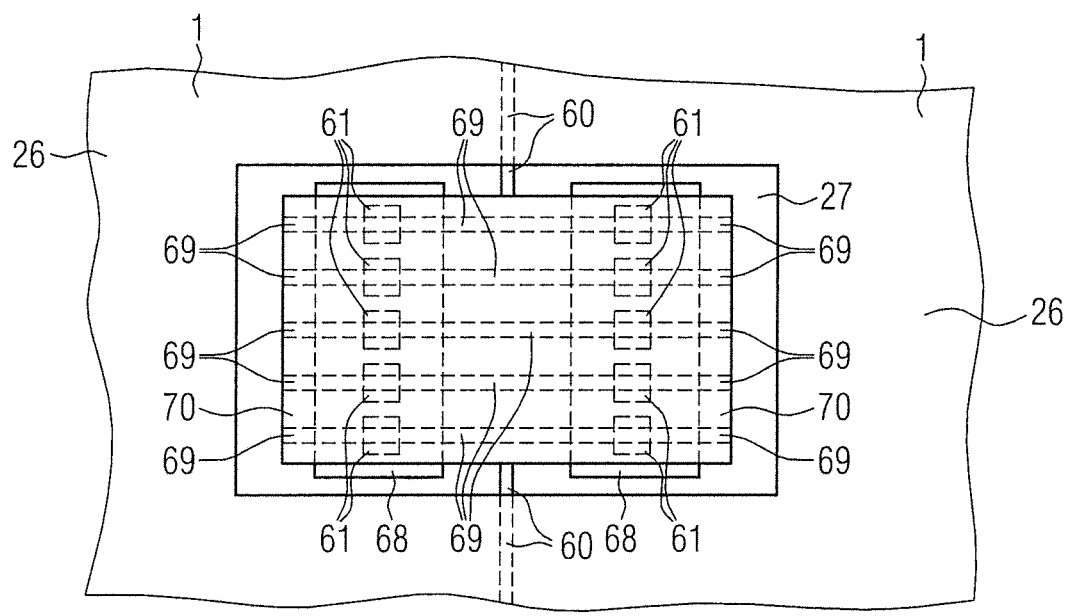
FIG. 19 shows a partial excerpt from a further example of modules arranged on a module carrier, wherein a respective flexible circuit board is provided as an electrical connector between contact pads of two adjacent modules.

FIG. 19 shows an arrangement configured substantially in accordance with FIG. 17, wherein, in this example the electrical contact pads 61 of the modules electrically conductively connect with the aid of a flexible circuit board 70. The further construction corresponds to the construction from FIG. 17.

Figure 20:
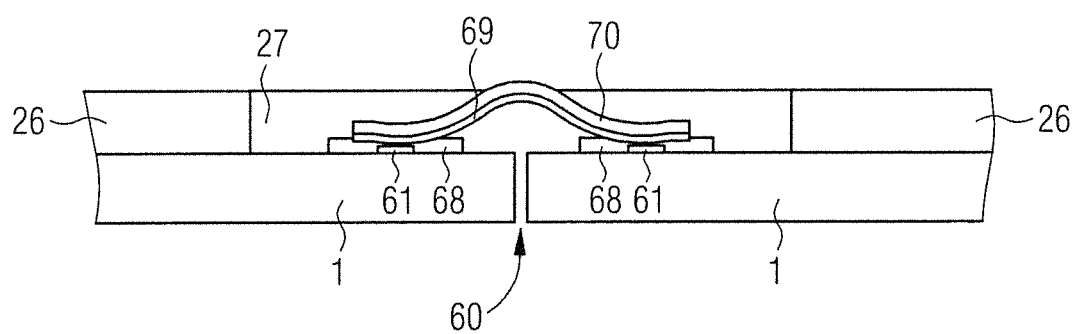
FIG. 20 shows a cross section through the arrangement from FIG. 19.

FIG. 20 shows a cross section through FIG. 19. In this example, the flexible circuit board is illustrated in an undulatory position. The use of the flexible circuit board comprises the advantage that alterations in the lateral distance between the modules may be compensated for, without the electrical contact connections between the circuit board and the contact pads 61 being impaired or damaged.

Figure 21:
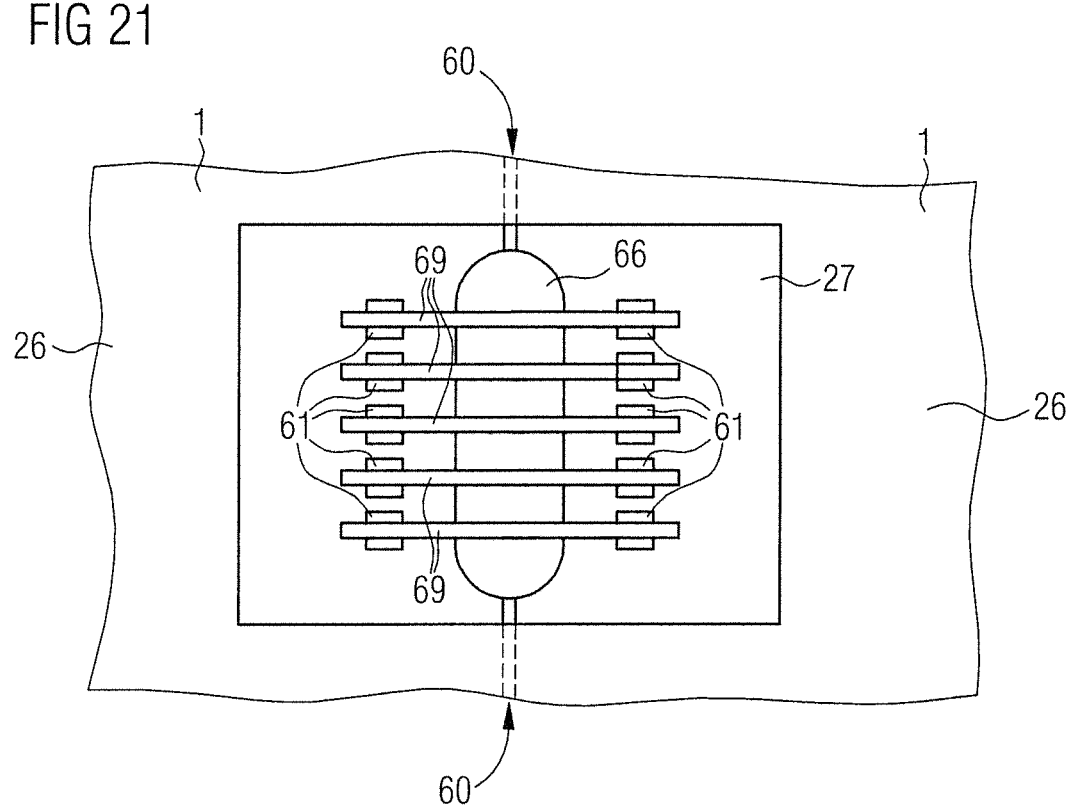
FIG. 21 shows a schematic partial excerpt from a further arrangement comprising modules arranged on a module carrier, wherein printed conductor tracks are provided as an electrically conductive connector between contact pads of adjacent modules.

FIG. 21 shows an arrangement in accordance with FIG. 11 with a further example of an electrical connector to connect the electrical contact pads 61 of two modules 1 arranged next to one another. In this example, a respective pair of contact pads 61 of two adjacent modules 1 connect to one another via a conductor track 69. For this purpose, a potting compound 66 is applied on the modules 1 in a region between the contact pads 61 such that both modules 1 are covered by the potting compound 66 on the side of the contact pads 61. The contact pads 61 themselves are free of the potting compound 66. Furthermore, the potting compound is also arranged in the region of the distance between the modules 1. Consequently, the potting compound 66 constitutes a connecting region that bridges the distance 60 between the two modules 1. The conductor tracks 69 may be applied with the aid of a printing method, for example. Silver ink, for example, may be applied as material for the conductor tracks 69, the silver ink being cured with the aid of a sintering process after being applied.

Figure 22:
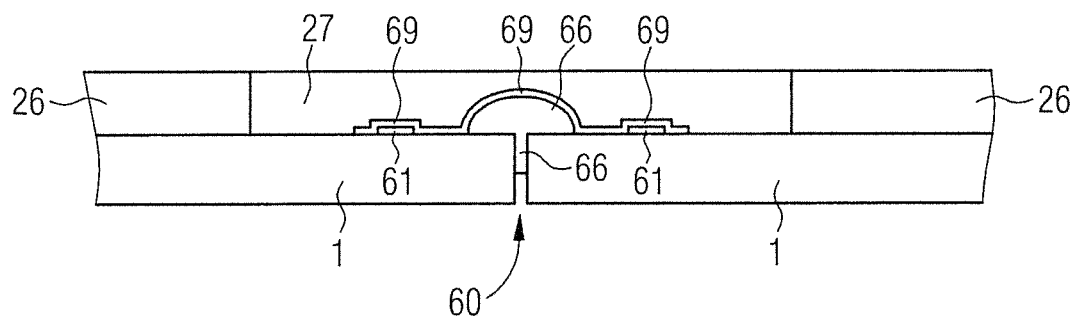
FIG. 22 shows a cross section through the arrangement from FIG. 21.

FIG. 22 shows a cross section through the arrangement from FIG. 21. In this example, it may be discerned that the potting compound 66 is also arranged in the distance 60 between the modules. Moreover, in the example illustrated, the potting compound 66 comprises a rounded surface. The conductor tracks 69 each extend transversely over the potting compound 66 from a contact pad 61 of one module 1 right into the region of a contact pad 61 of the other module 1.

Figure 23:
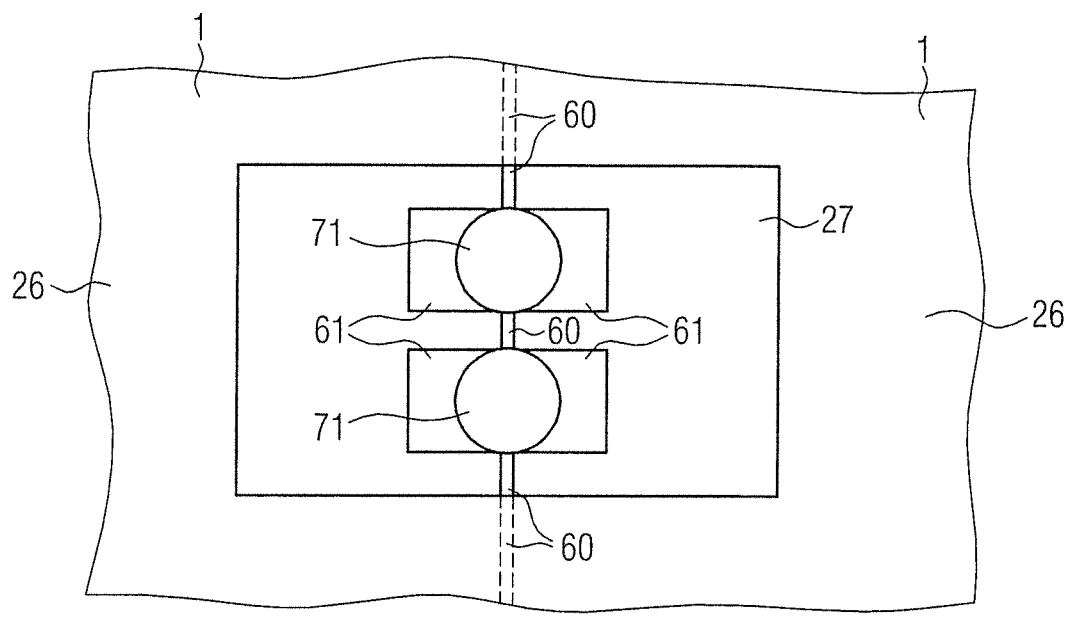
FIG. 23 shows a further partial excerpt from an arrangement comprising modules arranged on a module carrier, wherein contact segments, in particular solder balls, are provided as an electrically conductive connector.

FIG. 23 shows a plan view of a partial excerpt from an arrangement comprising two modules arranged at a predefined distance 60 from one another and secured on a module carrier 26. The modules each comprise, in a manner adjoining a marginal region, an electrically conductive contact pad 61 arranged in the region of a recess 27 of the module carrier 26. An electrically conductive line segment 71 is arranged between a respective pair of contact pads 61 of the two modules 1. An electrically conductive connection between the two contact pads 61 arranged opposite one another and on two different modules 1 is produced with the aid of the line segment 71 constituted from an electrically conductive material. The line segment 71 may consist of solder, for example, and be configured in the form of a solder ball, for example. The solder ball may be applied on the contact pads 61, for example, with the aid of a jetting process. A distance 60 between the modules may be less than 100 µm. A diameter of a line segment 71 may be greater than 300 µm. In this way, too, an electrical connector between the contact pads 61 of different modules 1 may be realized using simple means.

Figure 24:
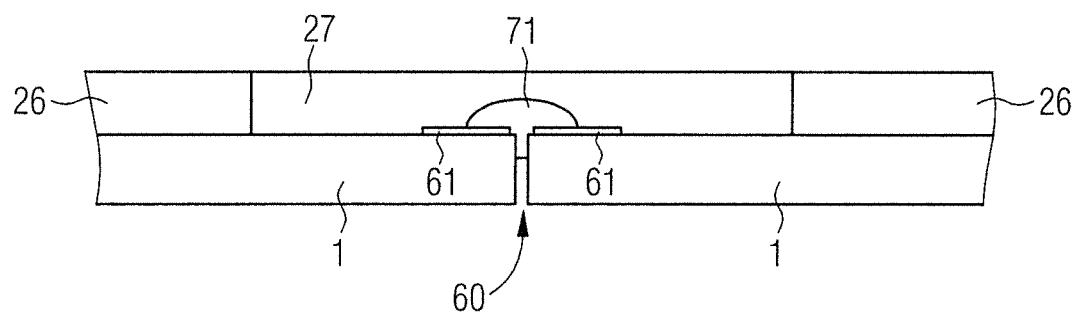
FIG. 24 shows a schematic cross section through the arrangement from FIG. 23.

FIG. 24 shows a cross section through the arrangement from FIG. 23. In this example, it may be discerned that the line segment 71 extends right into the distance between side faces of the modules 1.

Figure 25:
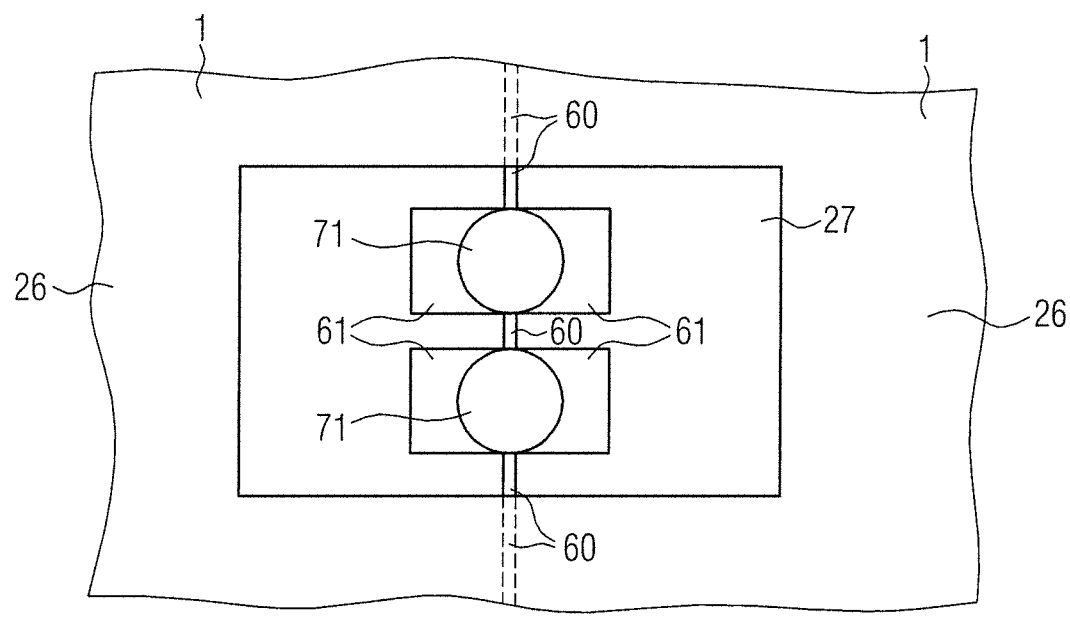
FIG. 25 shows a schematic illustration of a further example of an arrangement of modules on a module carrier comprising an electrically conductive connector in the form of contact segments.

FIG. 25 shows a plan view of an arrangement comprising an electrically conductive connector, which arrangement is configured substantially in accordance with FIG. 23.

Figure 26:
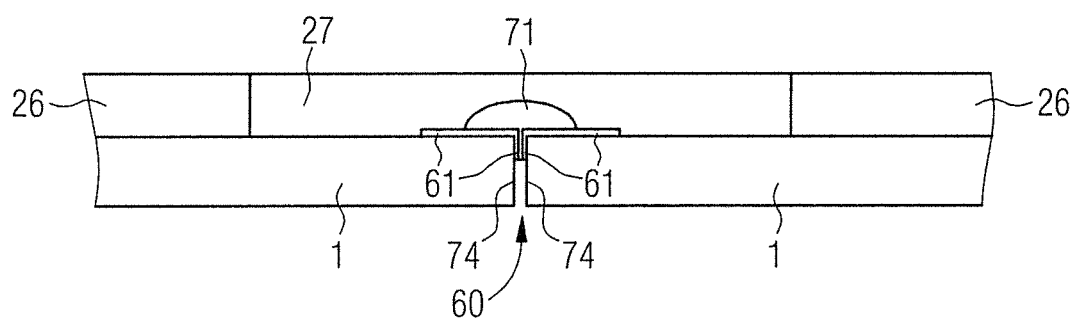
FIG. 26 shows a schematic cross section through the arrangement from FIG. 25.

FIG. 26 shows a cross section through the arrangement from FIG. 25. In this example, it may be discerned that the contact pads 61 of each module 1 extend right onto side faces 74 of the module 1, wherein the side faces 74 of the modules 1 face one another. Consequently, the contact pad 61 is formed not only on the underside of the module 1 but also on the side faces 74. An enlarged contact pad 61 in conjunction with little space requirement on the underside of the module 1 is realized in this way. Moreover, an improved electrically conductive connection between opposite contact pads 61 of adjacent modules may be realized with the aid of line segments since the material of the line segment 71 extends right into the intermediate region between the opposite contact pads 61 of the adjacent modules.

Figure 27:
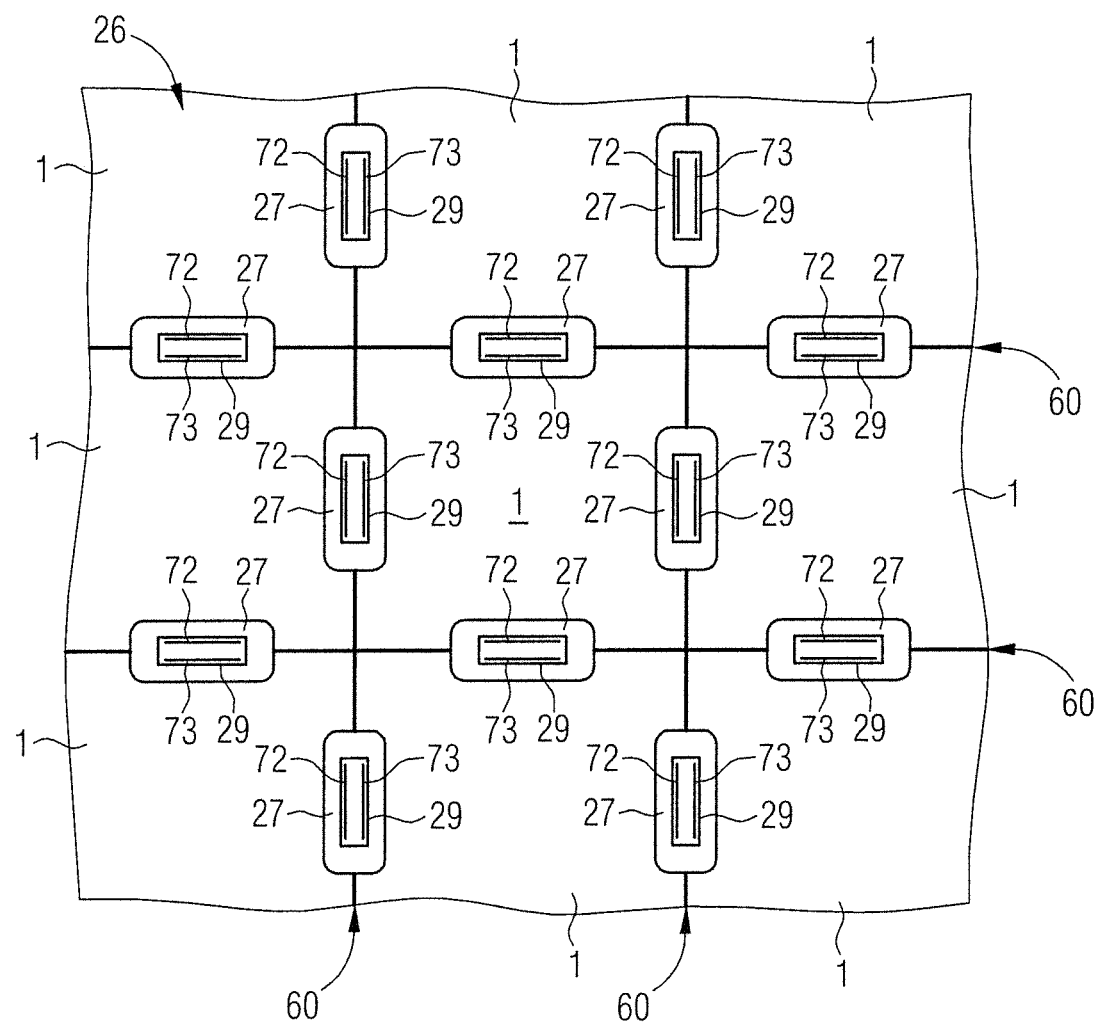
FIG. 27 shows a schematic partial excerpt from a rear side of a module carrier comprising a plurality of modules, wherein the module carrier comprises recesses in which electrical connectors that electrically connect electrical contact pads of adjacent modules are arranged.

FIG. 27 shows a schematic plan view of an underside of a module carrier 26 on which a plurality of modules 1 are arranged. The individual modules 1 are arranged at a distance 60 from one another and secured on the module carrier 26. The module carrier 26 comprises a plurality of recesses 27. The recesses 27 are arranged such that a recess 27 is arranged in the region between two side edges of two adjacent modules 1. The recesses 27 are introduced as continuous recesses, that is to say in the form of holes in the module carrier 26. The recesses 27 may also be configured only as recesses open on one side. In this example, the end of the recesses 27 that is respectively open on one side faces the modules 1.

Electrical connectors 29 are located in the recesses 27, the electrical connectors connecting electrical contacts of the adjacent modules 1, in particular contact pads, to one another. The electrical contacts are illustrated as first and second contact series 72, 73 schematically in the form of strips. A contact series 72, 73 may comprise at least one or a plurality of contacts or contact pads of the respective module 1. The electrical connector 29 may be realized in accordance with one of the examples described above. A recess 27 and accordingly a connector 29 may be provided for each module 1 at each side edge. A plurality of recesses 27 with a respective connector 29 may also be provided at each side of a module 1.

Figure 28:
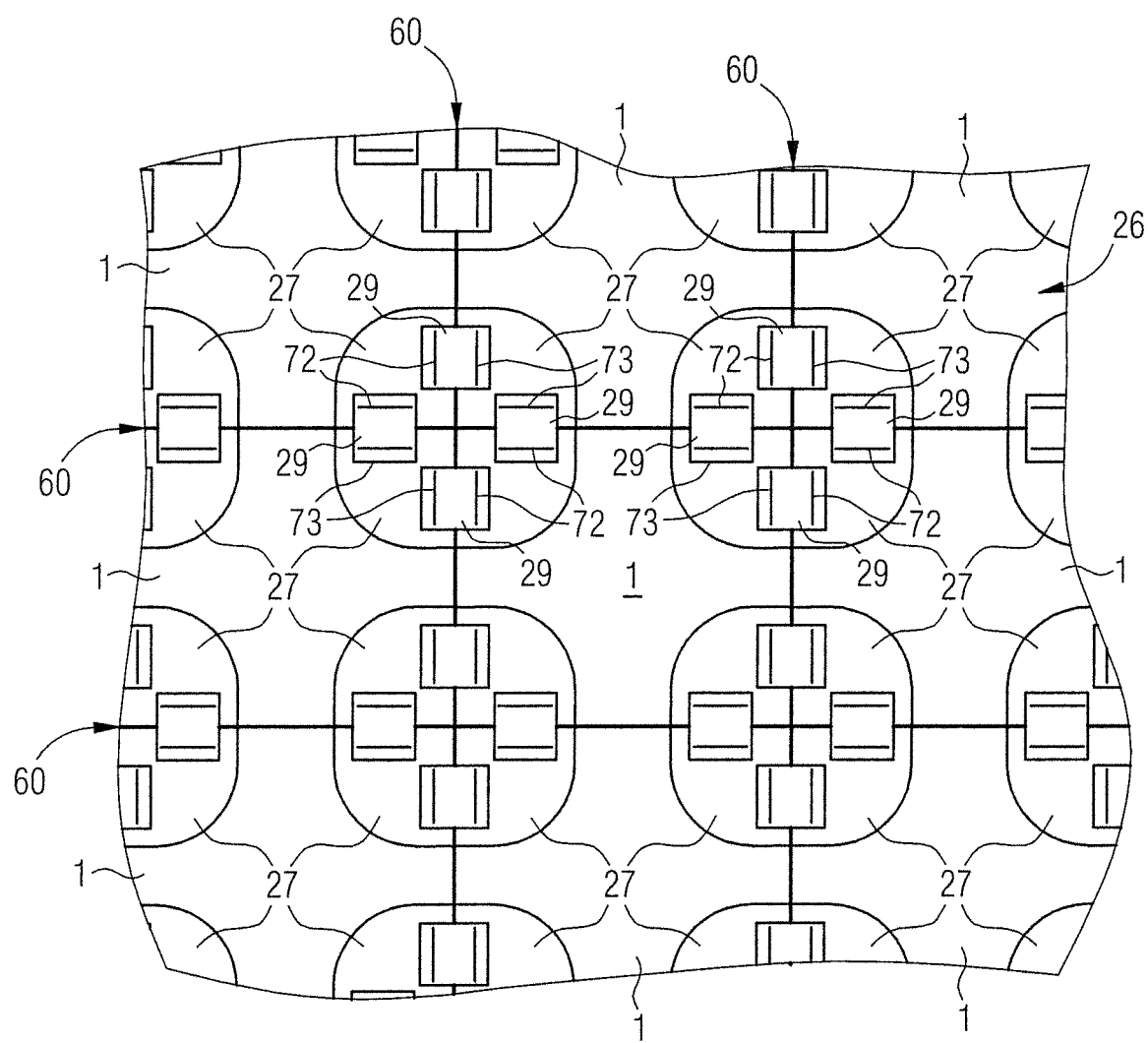
FIG. 28 shows a schematic plan view of a further example of a module carrier comprising modules, wherein recesses are arranged in corner regions of the modules and a plurality of electrical connectors are provided in a recess.

FIG. 28 shows a schematic plan view of an excerpt from a further example of an arrangement of a plurality of modules secured on a module carrier 26. In this example, the module carrier 26 comprises a plurality of recesses 27. The recesses 27 may be configured as recesses 27 open only on one side or as continuous recesses 27 in the module carrier 26. The recesses 27 are configured and arranged such that corner regions of four modules 1 adjoining one another are arranged in the region of the recess 27. Four corner regions of four modules adjoin one another in the region of the recess 27. More or fewer corner regions of modules may also adjoin one another in the region of the recess 27. Four electrical connectors 29 are arranged in the recess 27. Each electrical connector 29 connects the electrical contacts of two modules 1 adjoining one another. The electrical contacts are illustrated schematically as contact series 72, 73 in the form of strips. A contact series may comprise at least one electrical contact pad 61. The electrical connector 29 may be realized in accordance with one of the examples described above.

Figure 29:
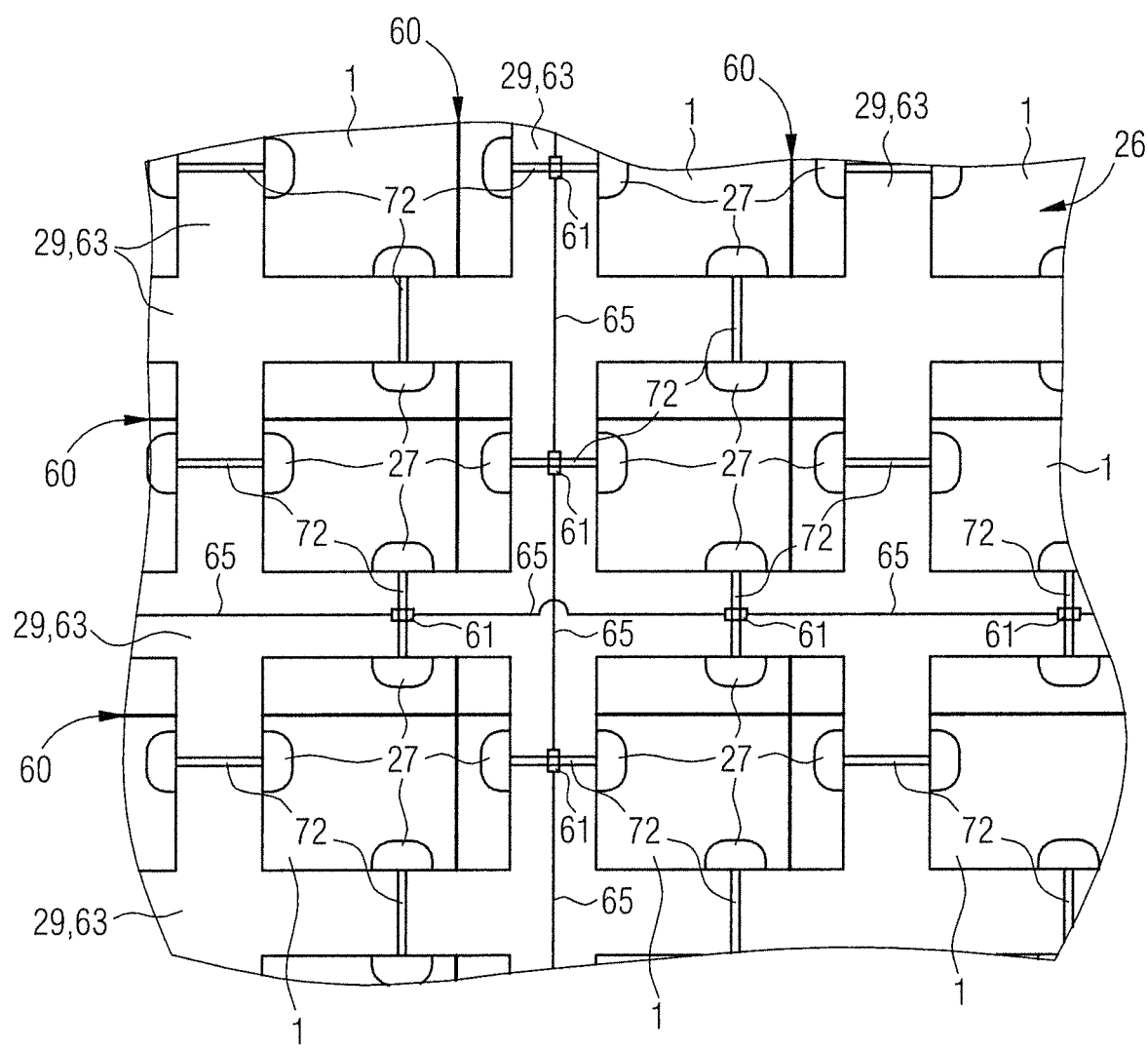
FIG. 29 shows a schematic plan view of a further example of an arrangement comprising modules on a module carrier, wherein electrically conductive connectors in the form of crossed lines are provided.

FIG. 29 shows a schematic plan view of an excerpt from a further examples of a plurality of modules 1 arranged on a module carrier 26. The module carrier 26 is illustrated as transparent. The module carrier 26 comprises a multiplicity of recesses 27. In this example, the recesses 27 are configured as continuous recesses 27 in the module carrier 26, that is to say that the recesses 27 are guided from an underside as far as a top side of the module carrier 26 and are open on both sides. At least one electrical contact pad, in particular a contact series 72 of electrical contact pads, of the module 1 is arranged in each recess 27. Moreover, an electrical connector 29 is formed, which contacts the electrical contact series 72 of adjacent modules 1 in the recesses 27 and electrically conductively connects them to one another. An electrical connector 29 extends over a plurality of modules 1. The electrical connector 29 comprises electrical lines 65 that electrically connects the contact pads 61 of the contact series 72 of adjacent modules 1 in series and/or in parallel. By way of example, the electrical connector 29 may comprise electrical conductor tracks, electrical wires and the like as electrical lines 65. By way of example, the electrical connector 29 may be configured in the form of a cable 63, a ribbon cable or a circuit board, in particular a flexible circuit board comprising corresponding conductor tracks. The electrical connectors 29 are arranged in rows and columns. The electrical connectors 29 arranged in rows each connect the electrically conductive contact pads of the contact series 72 of the modules 1 in series connection along a longitudinal extent of the row. The electrical connectors 29 arranged in columns transversely with respect to the rows each connect the electrically conductive contact pads of the contact series 72 of modules 1 in series and/or parallel connection along the column orientation.

The electrical connectors 29 are electrically insulated from one another and arranged in crossed fashion. The electrical connectors 29 are arranged on an underside of the module carrier 26 in a manner located opposite with respect to the modules 1. In the region of the recesses 27, the electrical lines of the electrical connectors 29 extend onto the underside of the modules 1 and electrically conductively connect to the electrical contact pads of the contact series 72 of the modules 1. In this example, as explained in the examples of FIGS. 14 to 22, a respective electrical contact pad 61 of a module connects in series to a further electrical contact pad 61 of a further module. For this purpose, the electrical connectors 29 comprise corresponding electrical lines 65 respectively connected to a contact pad 61 of the contact series 72. The electrical connectors 29 may also be configured in other shapes and/or numbers. By way of example, only one connector may be provided that connects contact series of at least two modules. For each connector 29 of the column arrangement and connector 29 of the row arrangement, a respective electrical line 65 is depicted schematically, which is guided from a contact pad 61 of a contact series 72 as far as a further contact pad 61 of a further contact series 72. In this way, the contact pads 61 of adjacent modules 1 electrically connect in series to one another column by column and row by row. A parallel and/or series interconnection of the electrical contact pads 61 of the modules 1 may also be realized.

Figure 30:
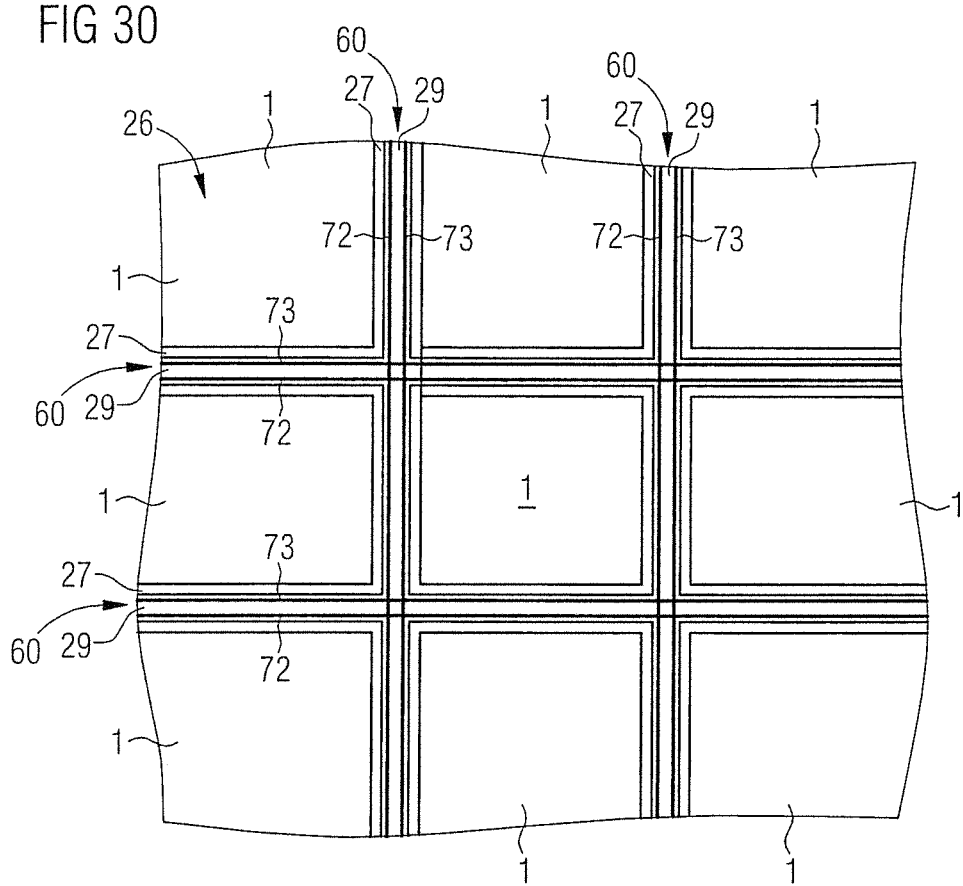
FIG. 30 shows a schematic plan view of a further arrangement of modules on a module carrier, wherein the module carrier comprises crossed recesses in which electrical connectors are provided.

FIG. 30 shows a schematic plan view of an excerpt from a further arrangement comprising a plurality of modules 1 arranged on a module carrier 26. The module carrier 26 is configured in transparent fashion. The modules 1 are configured in rectangular fashion and adjoin one another by corresponding side edges. In the region of the side edges, the modules 1 comprise electrical contact pads. The electrical contact pads of adjacent modules 1 are connected in series to one another via electrical connectors 29. The electrical connectors 29 are illustrated in the form of crossed strips arranged in accordance with the pattern of the side regions of the modules 1. The connectors 29 bring about a series connection of adjacent contact series 72, 73 of adjacent marginal regions of adjacent modules 1. For this purpose, the connectors 29 may be realized in accordance with one of the examples described above. The electrical connectors 29 are configured to each electrically connect an electrical contact pad 61 of a first module 1 in series to a further electrical contact pad 61 of an adjacent second module 1. In the figure, schematically instead of the contact pads 61, only the contact series 72, 73 are illustrated schematically. Each contact series 72, 73 may comprise at least one electrically conductive contact pad 61 of a module 1.

Figure 31:
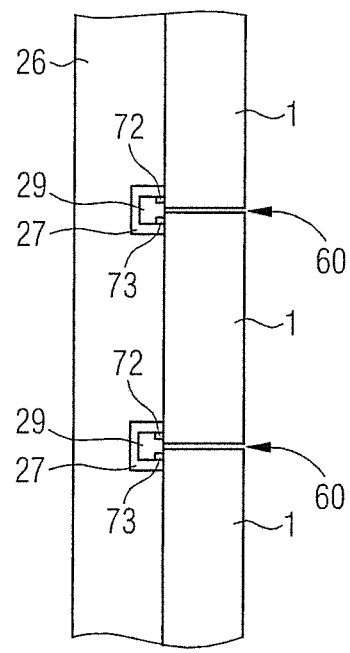
FIG. 31 shows a schematic cross section through the arrangement from FIG. 30.

FIG. 31 shows a schematic cross section through the arrangement from FIG. 30. In this example, the recesses 27 are realized as recesses 27 open only on one side. The recesses 27 may also be guided through the module carrier 26 in continuous fashion, that is to say as recesses open on both sides. The recesses 27 are configured as a crossed grid, wherein the grid is arranged above the marginal regions of the modules 1. The connectors 29 are arranged in the recesses 27. In an analogous manner, both a series and a parallel electrical interconnection of the contact pads, in particular of the contact series of the modules, may also be realized with the aid of the arrangement in FIGS. 30 and 31.

The arrangement of the modules 1 in accordance with FIGS. 30 and 31 may be produced, for example, by the following process steps. The modules 1 are secured with the light-emitting side facing downward onto a temporary carrier, for example, a vacuum table. Afterward, the modules 1 electrically interconnect to one another in the desired manner electrically with the aid of the electrical connectors 29. For this purpose, the electrical contact pads 61 of adjacent modules 1 are, e.g., electrically connected in series. Afterward, a module carrier 26 comprising recesses 27 is placed onto the arrangement of the modules 1 and connected to the modules 1. The connection may be carried out with the aid of adhesive bonding, soldering or screw connections. The arrangement of modules 1, which arrangement may constitute a display, may thereupon be detached from the temporary carrier.

Our modules and methods have been illustrated and described in more specific detail on the basis of preferred examples. Nevertheless, this disclosure is not restricted to the examples disclosed. Rather, other variations may be derived therefrom by those skilled in the art, without departing from the scope of protection of the appended claims.

This application claims priority of DE 10 2016 112 104.5, the subject matter of which is incorporated herein by reference.

The invention claimed is:

1. An arrangement comprising at least two modules for a video wall comprising light-emitting components arranged on a carrier, wherein a drive circuit that selectively drives the component at the carrier is provided for each component, row lines and column lines are provided, each drive circuit connects to a row line and a column line, each drive circuit connects to power supply lines, the carrier comprises plated-through holes that guide the row lines and the column lines onto an underside of the carrier, the at least two modules are arranged on a further carrier, the further carrier comprises at least one recess, an electrical connector is a plug connector and arranged within the recess of the further carrier, and the electrical connector directly connects electrically within the recess of the further carrier at least two column lines of the at least two modules to one another and/or at least two row lines of the at least two modules to one another.

2. The module according to claim 1, wherein the plated-through holes are arranged 1) in a marginal region adjoining a side edge of the module, and 2) at a distance from the side edge, and wherein the plated-through holes are circular.

3. The arrangement according to claim 1, wherein the further carrier comprises a further recess, a control circuit is arranged within the further recess, the control circuit drives the drive circuits, and the control circuit connects to column lines and row lines.

4. The arrangement according to claim 1, wherein at least two further modules are arranged on the further carrier, a respective module adjoins two other modules, the column lines and the row lines of the modules connect to one another via electrical connectors, the further carrier comprises a respective recess in regions in which side edges of the modules adjoin one another, an electrical connector is arranged within the recess, and an electrical connector directly connects within the recess column lines and/or row lines of adjacent modules to one another.

5. The arrangement according to claim 3, wherein the further recess connects to two recesses within the further carrier, and control lines of the control circuit are guided from the further recess within the further carrier directly to the two recesses and to the connectors of the two recesses and connect to column lines and row lines of the modules.

6. The arrangement according to claim 3, wherein the control circuit is arranged in the further carrier below the modules, and the further carrier is configured in plate-shaped fashion.

7. The arrangement according to claim 3, wherein electrical contacts are arranged on the underside of the carrier, said electrical contacts being connected to the plated-through holes, and at least one portion of the electrical contacts of the two modules electrically conductively connect to one another with the aid of the electrical connector.

8. The arrangement according to claim 7, wherein the electrical connector is configured in the form of a circuit board comprising conductor tracks, the conductor tracks connect the electrical contacts of the two modules, and the circuit board is configured as a flexible circuit board.

9. The arrangement according to claim 1, wherein the recess extends from a top side as far as an underside of the module carrier, at least two recesses are provided, each recess is arranged above contacts of a different module, the electrical connector connects to the contacts of the two modules, and the electrical connector extends over an underside of the module carrier between the two recesses and electrically conductively connects the electrical contacts of the two modules.

10. The arrangement according to claim 1, wherein the electrical connector is arranged in a recess, and the recess is open with respect to a top side of the module carrier and closed with respect to an underside of the module carrier.

11. An arrangement comprising at least two modules for a video wall comprising light-emitting components arranged on a carrier, wherein a drive circuit that selectively drives the component at the carrier is provided for each component, row lines and column lines are provided, each drive circuit connects to a row line and a column line, each drive circuit connects to power supply lines, the carrier comprises plated-through holes that guide the row lines and the column lines onto an underside of the carrier, the two modules are arranged on a further carrier, the modules adjoin each other with side edges, the further carrier comprises a recess in a region in which side edges of two modules adjoin one another, wherein an electrical connector is arranged within the recess of the further carrier, the electrical connector directly connects within the recess of the further carrier at least two column lines of the two modules and/or at least two row lines of the two modules to one another, the further carrier comprises a further recess, a control circuit is provided, wherein the control circuit is arranged within the further recess, the control circuit drives the drive circuits, the control circuit connects to column lines and row lines, at least two further modules are arranged on the further carrier, the further modules adjoin each other with side edges, the further carrier comprises an additional recess in a region in which side edges of the two further modules adjoin one another, wherein a further electrical connector is arranged within the additional recess of the further carrier, and the further electrical connector directly connects within the recess of the further carrier at least two column lines of the two further modules and/or at least two row lines of the two further modules to one another, the further recess is connected within the further carrier to the two recesses, control lines of the control circuit are guided from the further recess within the further carrier directly to the two recesses, control lines of the control circuit are connected to the two connectors, wherein one control line is connected via one connector to two column lines or to two row lines of two modules, the control circuit is arranged in the further carrier below the modules, and the further carrier is configured in plate-shaped fashion.

12. The module according to claim 11, wherein the module comprises a width and/or a length that are/is less than or equal to the number of image pixels along the width and/or respectively along the length multiplied by the width and/or respectively by the length of the image pixels, and/or wherein the carrier comprises further plated-through holes to guide a power supply onto the underside of the carrier, and/or wherein the components are configured as light-emitting diode chips.

13. The module according to claim 11, wherein the plated-through holes are arranged in a marginal region adjoining a side edge of the module, wherein the through holes are arranged with a distance from the side edge, wherein the through hole is circularly surrounded by the module.

14. The arrangement according to claim 11, wherein electrical contacts are arranged on the underside of the carrier, said electrical contacts being connected to the plated-through holes, and at least one portion of the electrical contacts of the two modules electrically conductively connect to one another with the aid of the electrical connector.

15. The arrangement according to claim 11, wherein the electrical connector comprises electrical lines, the electrical lines electrically conductively connect to the contacts, and the electrical lines are covered with an electrically insulating material or are embedded into an electrically insulating material.

16. The arrangement according to claim 11, wherein the electrical connector is configured in the form of a circuit board comprising conductor tracks, the conductor tracks connect the electrical contacts of the two modules, and the circuit board is configured as a flexible circuit board.

17. The arrangement according to claim 11, wherein the electrical connector is configured in the form of line segments or solder balls, the line segments are directly contacted with the electrical contacts, the contacts extend right onto side faces of the modules, and the line segments extend between the side faces in the region of the contacts arranged at the side faces.

18. The arrangement according to claim 11, wherein the recess extends from a top side as far as an underside of the module carrier, at least two recesses are provided, each recess is arranged above contacts of a different module, the electrical connector connects to the contacts of the two modules, and the electrical connector extends over an underside of the module carrier between the two recesses and electrically conductively connects the electrical contacts of the two modules.

19. The arrangement according to claim 11, wherein the electrical connector is arranged in a recess, and the recess is open with respect to a top side of the module carrier and closed with respect to an underside of the module carrier.

20. An arrangement comprising at least two modules for a video wall comprising light-emitting components arranged on a carrier, wherein a drive circuit that selectively drives the component at the carrier is provided for each component, row lines and column lines are provided, each drive circuit connects to a row line and a column line, each drive circuit connects to power supply lines, the carrier comprises plated-through holes that guide the row lines and the column lines onto an underside of the carrier, the two modules are arranged on a further carrier, the further carrier comprises at least one recess, an electrical connector is arranged within the recess of the further carrier, and the electrical connector directly connects within the recess of the further carrier at least two column lines of the two modules to one another and/or at least two row lines of the two modules to one another, the further carrier comprises a further recess, a control circuit is arranged within the further recess, the control circuit drives the drive circuits, and the control circuit connects to column lines and row lines, electrical contacts are arranged on the underside of the carrier, said electrical contacts being connected to the plated-through holes, and at least one portion of the electrical contacts of the two modules electrically conductively connect to one another with the aid of the electrical connector, and the electrical connector connects to the contacts via a plug connector or an SMD plug connector.

* * * * *